United States Patent
Fiske

(10) Patent No.: US 9,235,697 B2
(45) Date of Patent: Jan. 12, 2016

(54) ONE-TIME PASSCODES WITH ASYMMETRIC KEYS

(71) Applicant: Biogy, Inc., San Francisco, CA (US)

(72) Inventor: Michael Stephen Fiske, San Francisco, CA (US)

(73) Assignee: Biogy, Inc., San Francisco, CA (US)

( * ) Notice: Subject to any disclaimer, the term of this patent is extended or adjusted under 35 U.S.C. 154(b) by 0 days.

(21) Appl. No.: 13/785,766

(22) Filed: Mar. 5, 2013

(65) Prior Publication Data

US 2014/0201536 A1    Jul. 17, 2014

Related U.S. Application Data

(60) Provisional application No. 61/634,778, filed on Mar. 5, 2012.

(51) Int. Cl.

| | | |
|---|---|---|
| G06F 21/00 | (2013.01) | |
| H04L 29/06 | (2006.01) | |
| G06F 21/32 | (2013.01) | |
| H04L 9/08 | (2006.01) | |

(Continued)

(52) U.S. Cl.
CPC .............. G06F 21/32 (2013.01); H04L 9/0816 (2013.01); H04L 9/0844 (2013.01); H04L 9/3228 (2013.01); H04L 9/3231 (2013.01)

(58) Field of Classification Search
CPC ..... G06F 21/32; H04L 9/0816; H04L 9/0844; H04L 9/3231; H04L 9/3228
USPC ............................................ 713/183; 726/18
See application file for complete search history.

(56) References Cited

U.S. PATENT DOCUMENTS

| | | |
|---|---|---|
| 5,604,801 A | 2/1997 | Dolan et al. |
| 5,623,548 A | 4/1997 | Akiyama et al. |

(Continued)

FOREIGN PATENT DOCUMENTS

| | | |
|---|---|---|
| EP | 1 909 080 A1 | 4/2008 |
| JP | 2005-198189 A | 7/2005 |

(Continued)

OTHER PUBLICATIONS

Elboukhari, M.; Azizi, A.; Azizi, M.; "Implementation of Secure Key Distribution based on Quantum Cryptography"; Multimedia Computing and Systems, 2009. ICMCS '09. International Conference on Year: Mar. 2009; pp. 361-365.*

(Continued)

*Primary Examiner* — Nirav B Patel
*Assistant Examiner* — Courtney Fields
(74) *Attorney, Agent, or Firm* — David Lewis

(57) ABSTRACT

Protecting the security of an entity by using passcodes is disclosed. A user's passcode device generates a passcode. In an embodiment, the passcode is generated in response to receipt of user information. The passcode is received by another system, which authenticates the passcode by at least generating a passcode from a passcode generator, and comparing the generated passcode with the received passcode. The passcode is temporary. At a later use a different passcode is generated from a different passcode generator. In these embodiments, there are asymmetric secrets stored on the passcode device and by the administrator. This adds more security so that if the backend servers are breached, the adversary cannot generate valid passcodes. In some embodiments, the passcode depends on the rounded time.

52 Claims, 18 Drawing Sheets

(51) Int. Cl.
*H04L 9/32* (2006.01)
*G06F 21/33* (2013.01)
*G06F 21/34* (2013.01)

(56) References Cited

U.S. PATENT DOCUMENTS

| | | | |
|---|---|---|---|
| 5,768,382 A | 6/1998 | Schneier et al. | |
| 5,802,199 A | 9/1998 | Pare, Jr. et al. | |
| 5,825,880 A | 10/1998 | Sudia et al. | |
| 6,041,410 A | 3/2000 | Hsu et al. | |
| 6,064,880 A | 5/2000 | Alanara | |
| 6,105,131 A | 8/2000 | Carroll | |
| 6,112,187 A | 8/2000 | Fukawa | |
| 6,144,293 A | 11/2000 | Plaschko et al. | |
| 6,307,956 B1 | 10/2001 | Black | |
| 6,311,270 B1 | 10/2001 | Challener et al. | |
| 6,607,136 B1 | 8/2003 | Atsmon et al. | |
| 6,636,973 B1 | 10/2003 | Novoa et al. | |
| 6,748,588 B1 | 6/2004 | Fraser et al. | |
| 6,782,120 B2 | 8/2004 | Mödl et al. | |
| 6,853,988 B1 | 2/2005 | Dickinson et al. | |
| 6,879,689 B2 | 4/2005 | Carroll et al. | |
| 6,993,658 B1* | 1/2006 | Engberg et al. | 713/185 |
| 7,047,426 B1 | 5/2006 | Andrews et al. | |
| 7,066,382 B2 | 6/2006 | Kaplan | |
| 7,103,772 B2 | 9/2006 | Jørgensen et al. | |
| 7,200,220 B1 | 4/2007 | Yamao | |
| 7,215,769 B2 | 5/2007 | Fiske | |
| 7,222,238 B2 | 5/2007 | Bleumer et al. | |
| 7,249,116 B2 | 7/2007 | Fiske | |
| 7,308,708 B2 | 12/2007 | Blume | |
| 7,319,987 B1 | 1/2008 | Hoffman et al. | |
| 7,353,541 B1 | 4/2008 | Ishibashi et al. | |
| 7,398,260 B2 | 7/2008 | Fiske | |
| 7,415,614 B2 | 8/2008 | Guillou | |
| 7,565,548 B2 | 7/2009 | Fiske et al. | |
| 7,603,565 B2 | 10/2009 | Baird, III et al. | |
| 7,657,033 B2 | 2/2010 | Fiske | |
| 7,669,236 B2 | 2/2010 | Fiske | |
| 7,702,911 B2 | 4/2010 | Fiske | |
| 7,707,622 B2 | 4/2010 | Fiske | |
| 7,770,018 B2 | 8/2010 | Fiske | |
| 7,886,155 B2 | 2/2011 | Fiske | |
| 7,979,716 B2 | 7/2011 | Fiske | |
| 8,077,933 B1 | 12/2011 | Fiske | |
| 8,127,141 B2 | 2/2012 | Hyppönen | |
| 8,209,751 B2 | 6/2012 | Fiske | |
| 8,817,981 B2 | 8/2014 | Fiske | |
| 2001/0045451 A1 | 11/2001 | Tan et al. | |
| 2002/0124176 A1 | 9/2002 | Epstein | |
| 2002/0176580 A1 | 11/2002 | Horiuchi et al. | |
| 2003/0046589 A1 | 3/2003 | Gregg | |
| 2003/0208697 A1 | 11/2003 | Gardner | |
| 2003/0236761 A1 | 12/2003 | Fiske | |
| 2004/0107170 A1 | 6/2004 | Labrou et al. | |
| 2004/0117636 A1 | 6/2004 | Cheng | |
| 2004/0199775 A1 | 10/2004 | Ser | |
| 2004/0228480 A1 | 11/2004 | Fiske | |
| 2004/0236694 A1 | 11/2004 | Tattan et al. | |
| 2004/0267387 A1 | 12/2004 | Samadani | |
| 2005/0044044 A1 | 2/2005 | Burger et al. | |
| 2005/0044425 A1 | 2/2005 | Hypponen | |
| 2005/0193198 A1 | 9/2005 | Livowsky | |
| 2005/0210267 A1 | 9/2005 | Sugano | |
| 2006/0107040 A1 | 5/2006 | Fiske | |
| 2006/0107041 A1 | 5/2006 | Fiske | |
| 2006/0107064 A1 | 5/2006 | Fiske | |
| 2006/0107067 A1 | 5/2006 | Safal | |
| 2006/0107068 A1 | 5/2006 | Fiske | |
| 2006/0107309 A1 | 5/2006 | Fiske | |
| 2006/0107315 A1 | 5/2006 | Fiske | |
| 2006/0117188 A1 | 6/2006 | Fiske | |
| 2006/0129811 A1 | 6/2006 | Fiske | |
| 2006/0230284 A1 | 10/2006 | Fiske | |
| 2006/0259894 A1 | 11/2006 | Fiske | |
| 2007/0118754 A1 | 5/2007 | Togashi | |
| 2007/0255963 A1 | 11/2007 | Pizano et al. | |
| 2007/0258595 A1 | 11/2007 | Choy | |
| 2007/0281664 A1 | 12/2007 | Kaneko et al. | |
| 2007/0297610 A1 | 12/2007 | Chen et al. | |
| 2008/0288786 A1 | 11/2008 | Fiske | |
| 2008/0294899 A1 | 11/2008 | Gazzetta et al. | |
| 2009/0013402 A1 | 1/2009 | Plesman | |
| 2009/0025090 A1 | 1/2009 | Clement | |
| 2009/0055458 A1 | 2/2009 | O'Neil | |
| 2009/0158049 A1 | 6/2009 | Fiske | |
| 2009/0178115 A1 | 7/2009 | Fiske | |
| 2009/0228714 A1 | 9/2009 | Fiske et al. | |
| 2009/0292920 A1 | 11/2009 | Willey | |
| 2010/0011222 A1 | 1/2010 | Fiske | |
| 2010/0046755 A1 | 2/2010 | Fiske | |
| 2011/0030053 A1 | 2/2011 | Lin et al. | |
| 2011/0213979 A1 | 9/2011 | Wiseman et al. | |
| 2011/0274273 A1 | 11/2011 | Fiske | |
| 2012/0047563 A1 | 2/2012 | Wheeler | |
| 2012/0177201 A1* | 7/2012 | Ayling et al. | 380/278 |
| 2012/0311320 A1* | 12/2012 | Brown et al. | 713/155 |
| 2013/0042111 A1 | 2/2013 | Fiske | |

FOREIGN PATENT DOCUMENTS

| | | |
|---|---|---|
| JP | 2009-3501 A | 1/2009 |
| WO | WO 2006/055767 A2 | 5/2006 |
| WO | WO 2006/069082 A2 | 6/2006 |
| WO | WO 2006/091301 A2 | 8/2006 |
| WO | WO 2007/075156 A2 | 7/2007 |
| WO | WO 2008053279 A1 * | 5/2008 |
| WO | WO 2012/053883 A1 | 4/2012 |
| WO | WO 2012/097362 A2 | 7/2012 |
| WO | WO 2013/044192 A2 | 3/2013 |
| WO | WO 2015/023550 A1 | 2/2015 |

OTHER PUBLICATIONS

Weiss, Kenneth P. "When a Password is Not a Password" IEEE 1990 International Carnahan Conference on Security Technology. Pub. Date: Oct. 1990. Relevant pp. 100-108. Found on the World Wide Web at: http://ieeexplore.ieee.org/stamp/stamp.jsp?tp=&arnumber=111393.

* cited by examiner

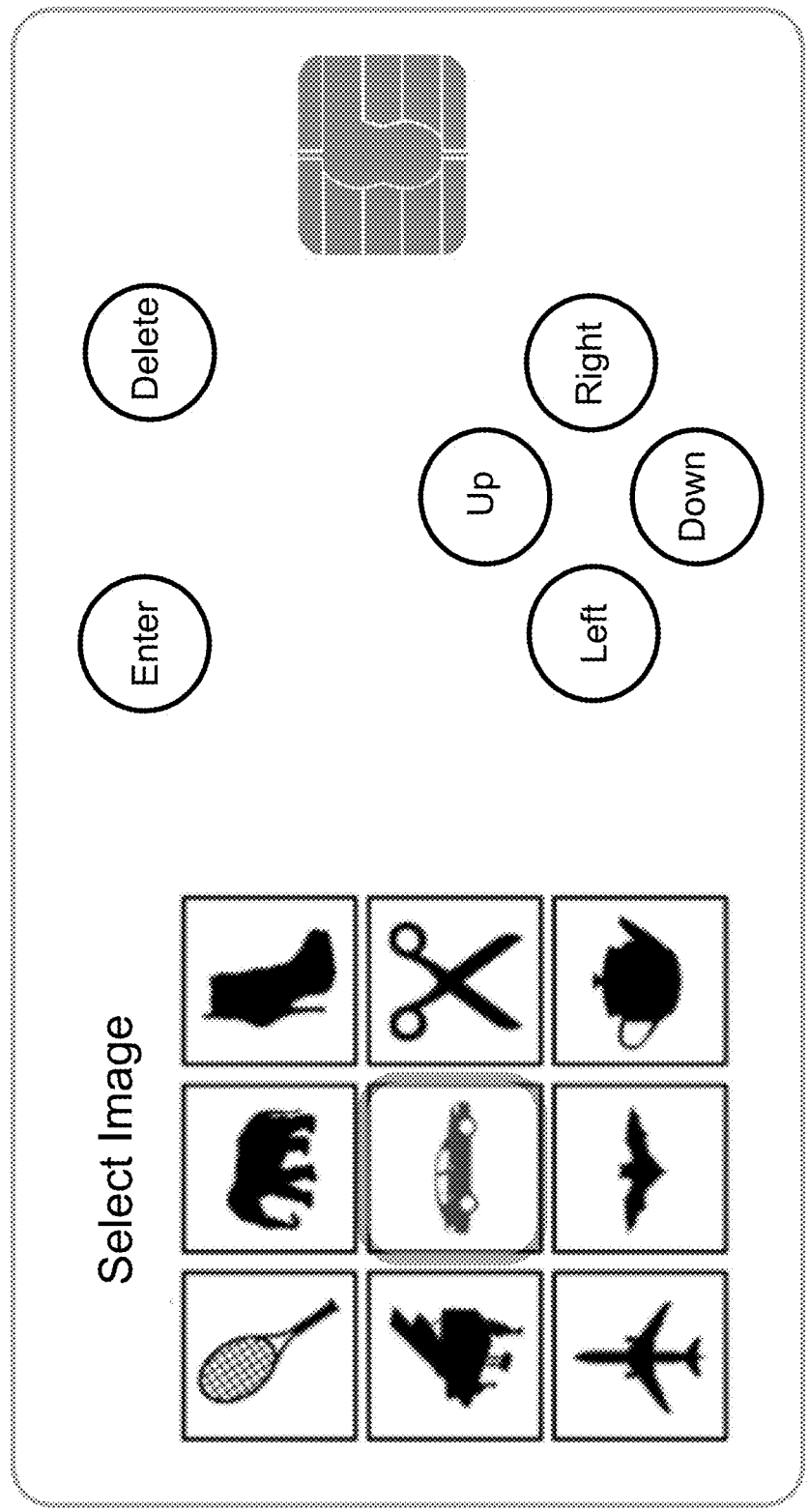

ONE-TIME PASSCODES WITH ASYMMETRIC KEYS

CROSS-REFERENCE TO RELATED APPLICATIONS

This application claims priority benefit of U.S. Provisional Patent Application No. 61/634,778, filed Mar. 5, 2012, entitled "One-Time Passcodes with Asymmetric Keys," which is incorporated herein by reference.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the "some advantages section" represents different approaches, which in and of themselves may also be inventions, and various problems, which may have been first recognized by the inventor.

In many applications a password is required to grant access to a system or authorize a transaction. Today many users have so many different passwords that it is difficult to remember them. In other cases, a password can be stolen by a thief, making passwords susceptible to fraud.

LIMITATIONS AND WEAKNESSES OF PRIOR ART

In March, 2011, EMC Corp's RSA security division announced a massive breach of its SecurID products. On Mar. 19, 2011, the Wall Street Journal stated the following.

A security company that provides computer-access keys used by thousands of businesses around the world disclosed a serious break-in, but left many customers scrambling to figure out what was taken and how they might be affected.

EMC Corp's RSA Security division Thursday said it has experienced an "extremely sophisticated cyber attack" on its computer systems, resulting in the theft of information related to its SecurID products.

Those products include tokens, which can be the size of a credit card or key-chain fob, that are used by employees to access corporate computer networks. The token generates every minute a new six-digit number that is synchronized with central security servers.

RSA held a conference call with customers Friday to discuss the intrusion, but didn't specify what information was taken by the attackers and declined additional comment. RSA says SecurID system is used by more than 25,000 corporations, and more than 40 million users around the world.

"RSA is distributing a set of best practices that they say will protect you," said Bruce Jones, head of global information-technology security at Eastman Kodak Co. Beyond that, he said, RSA isn't telling customers much more about the incident.

We are getting very little information, primarily because it is an open criminal investigation and the law-enforcement agencies are limiting RSA to what they can share," Mr. Jones said.

Security experts interpreted the statements that RSA issued Thursday to indicate the attackers may have obtained so-called "seed" keys, which include number associated with each token.

RSA said Thursday it is confident that the stolen information "does not enable a successful direct attack" on any SecurID users, but added that the information "could potentially be used to reduce the effectiveness" of the security scheme as part of a broader attack. Hackers have already demonstrated the ability to decrypt other authentication factors used to make networks safe, and "this just exacerbates the situation," said Avivah Ltan, an analyst with research firm Gartner.

Art Coviello, RSA's executive chairman, described the attack in an open letter Thursday as an "advanced persistent threat"—a category of computer crime often associated with efforts to steal specific sorts of information over a considerable period of time. Such attacks typically are associated with criminal groups, which in recent years have often operated out of Eastern Europe, analysts said. Mr. Coviello didn't discuss any suspects for the attack, but said the company is working with law-enforcement agencies.

Friday's conference call mainly focused on what customers should do to beef up their own security, such as making sure no rogue programs had been installed on servers running RSA software and suggesting that users increase the length of PIN numbers from four to eight digits, according to one person who participated.

"RSA's limited disclosures may have been driven by the desire to avoid creating a panic among its customers", said Jonathan Penn, an analyst at Forrester Research. He anticipates that RSA will reach out to customers through its sales force and support staff in the coming days.

Paul Kocher, president of security-technology firm Cryptography Research, said the incident raises questions about the viability of RSA's model of serving as a central repository for seed keys. Some rivals have created systems that use software at customer sites to generate such keys. "It's a big problem" for RSA, Mr. Kocher said. "They are going to have a hard time convincing their customers that they should hold their keys."

Despite the original claim that this loss of seed information on RSA networks did not enable a direct attack, in June 2011, the adversary phished PINS from employees of defense contractors and penetrated the corporate networks of these defense contractors with offices in Washington D.C. According to Krebs Security, over 700 institutions worldwide had their networks compromised as a consequence of the SecurID breach.

Because the backend server that authenticates SecurID passcodes uses the same seed as the token, after the seed information was stolen from RSA's network, the adversary was able to launch a successful attack. In summary, THE ADVERSARY WAS ABLE TO REMOTELY ACCESS CORPORATE NETWORKS OF U.S. DEFENSE CONTRACTORS WITHOUT HAVING AN RSA SecurID token in their physical possession. At least part of SecurID's security vulnerability and security breach was caused by the fact that the seed for a particular token is the same as the corresponding seed on the backend server. In other words, the prior art uses the same shared secret on the physical token device and the backend server that performs the authentication and administers access to a network or other resource. In some cases, this is referred to as symmetric seeds or symmetric keys. In some cases, this is referred to as a shared symmetric secret.

SOME ADVANTAGES OVER PRIOR ART

In light of the aforementioned RSA SecurID breach announced in March 2011, the embodiments, presented here, have the advantages of DECENTRALIZATION and NON- DETERMINISM, which substantially increases the quality of the security provided in a cybersecurity system across many applications and embodiments: securing financial transactions; securing critical infrastructure such as the electrical grid; securing private networks such as SIPRNet <http://en.wikipedia.org/wiki/SIPRNet>; securing physical objects and infrastructure such as autos, trucks, farm machinery, cranes, ships, airplanes, jets, tanks, safes, houses, hotels, hospitals, office buildings, military bases, satellites, power plants, manufacturing plants, mines and stadiums that offer entertainment (football, soccer, music, etc).

A.) DECENTRALIZATION. Generation of the registration code and passcode generators and keys and the use of all user credentials is decentralized in the embodiments presented here. The purpose of the decentralization is to force the hackers or adversary to compromise these cybersecurity system embodiments one device at a time. This is considerably more expensive, more difficult and far more time consuming for the adversary. This decentralization also helps protect the privacy of the person who owns the device. Furthermore, this decentralization also reduces the possibility of one hacker(s) breach, enabling the hacker(s) to have unauthorized access across the whole world using this security system or suite of products.

B.) NON-DETERMINISM. Non-determinism pertains to using a physical process to generate keys, passcode generators or registration codes. This means that these sequence of bits are not created by a computer algorithm, which are deterministic. Part of the RSA SecurID breach pertained to capturing seed information on their network, which means that there seeds were already determined. Passcode generators, keys and registration codes created from a non-deterministic physical process after enrollment means that before enrollment, these values are extremely difficult to predict. This provides a greater level of security and also helps in decentralizing the security since the passcode generators, keys and registration codes are derived from the particular non-deterministic physical process on that unique passcode device.

The embodiments disclosed here are superior to the prior art such as RSA SecurID and other token vendors, because compromising these cybersecurity embodiments requires hackers breaking into one physical device (e.g. mobile phone, USB token, etc) at a time. At least some of the security advantage pertains to the fact that part of the secret stored on the physical token is distinct and mathematically intractable to derive from part of the secret stored on the backend server. Another part of the security advantage pertains to the fact that the asymmetric secrets are not generated until after enrollment or setup of the Biogy token device in the field. Further, the asymmetric secrets are generated from a non-deterministic physical process.

Hence, a breach of any Biogy <http://www.biogy.com> network or its documents that describe its algorithms or source code, does not reveal any information about how to predict the asymmetric secrets. Also, one key, called the user key, that is part of the asymmetric secret is stored on the physical token or in a secure area of the mobile device (e.g., a secure of a chip in a mobile phone). The other key, called the administrator key, that is part of the asymmetric secret is stored and administered on backend servers: a compromise of the backend server and any information of the administrator key on the backend server(s) doesn't reveal the user key on the token. In other words, the user key and the administrator key are distinct. Further, it is mathematically intractable to derive the user key when the adversary has the administrator key. Furthermore, it is mathematically intractable to derive the administrator key when the adversary has the user key.

BRIEF DESCRIPTION

In the following drawings like reference numbers are used to refer to like elements. Although the following figures depict various examples of the invention, the invention is not limited to the examples depicted in the figures.

FIG. 3C shows an example of a passcode device in a smartcard embodiment where the selection of images are used to identify the user before the next passcode is generated.

DESCRIPTION

A passcode generator is disclosed, which may implement a method for reducing the possibility of a thief stealing a password or other types of user information. Furthermore, the user does not have to remember her passcode as the generator creates one-time passcodes that may only be used once. In an embodiment, after a passcode is used once, it will no longer enable access to a system or account. In addition, optionally, the passcode generator can be a standalone portable device (e.g. USB token with battery or credit card with a smart card chip or a mobile phone) that makes it difficult for an attacker to gain access to. The portable embodiment enables users to generate one-time passcodes with asymmetric secrets in remote places such as inside an airplane, out on an oil tanker, in a satellite, and other places far removed from AC power sources.

Figure 5A:
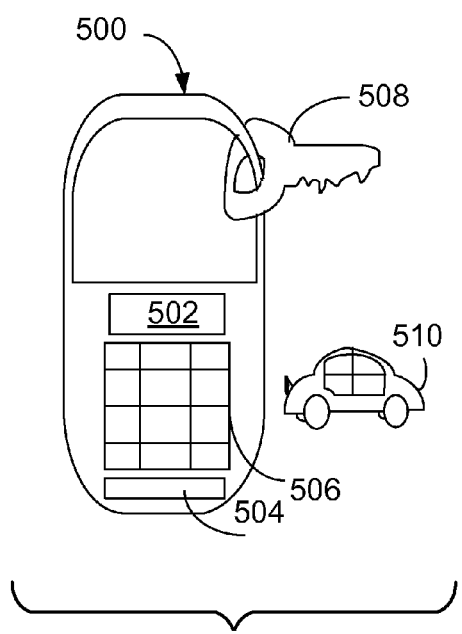
FIG. 5A shows an example of the system of FIG. 1A.
Figure 5B:
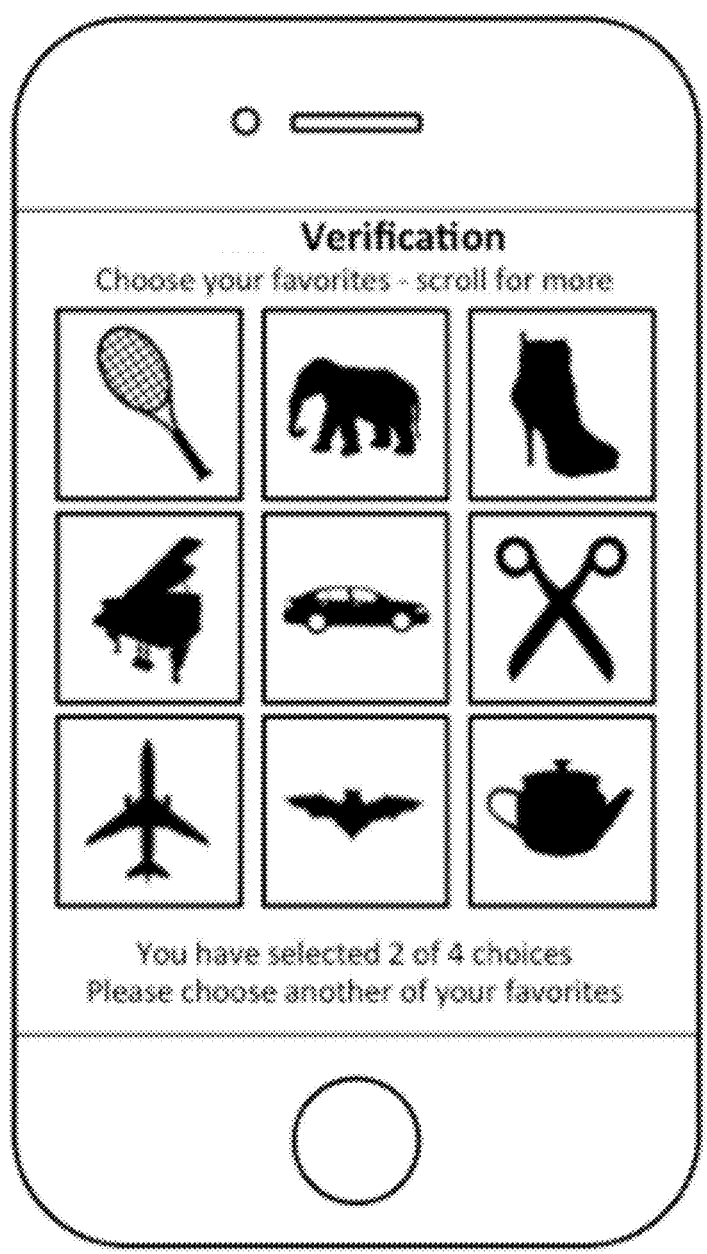
FIG. 5B shows an example of a passcode device in a smartphone embodiment where the selection of images are used to verify the user.
Figure 6:
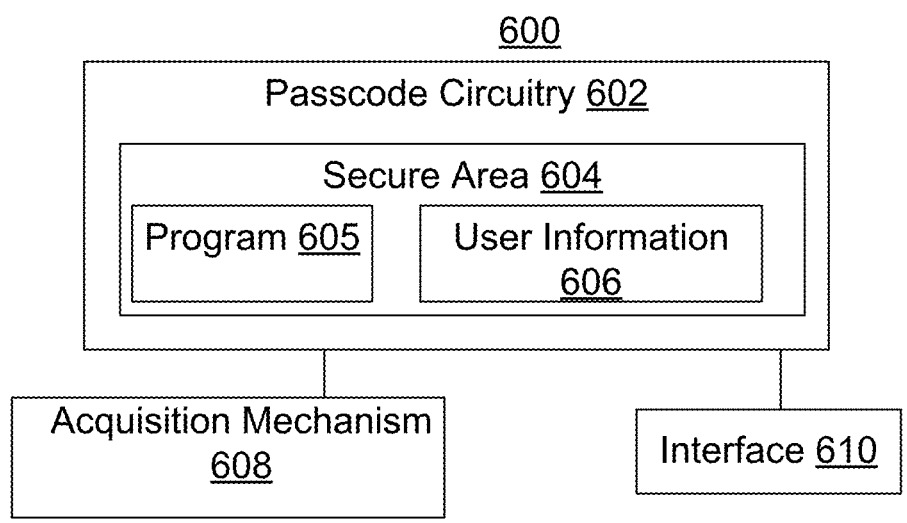
FIG. 6 shows a block diagram of a circuit of an example of a passcode device.

The system below is described using biometric prints or a PIN or a recognizable collection of images to authenticate the user as shown in FIG. 5B. Biometric prints may be fingerprints, face prints, iris scans, toe prints, voice prints, prints created from multiple fingers, handprints, footprints, or even DNA prints. In an embodiment, the item used to generate the passcodes is any item that is unique. In an embodiment the item used to generate the passcode is one that is difficult to fabricate, guess, find by trial and error, and/or compute. In an embodiment, the item used to generate the passcodes is uniquely associated with the user. In an embodiment, the item used to generate the passcodes has an unpredictable element to it.

An embodiment of the passcode generator uses a secure device that produces unique passcodes that can be used as one-time passwords. For each acquired biometric print, the derived passcodes created from it are unique. Another embodiment of the invention includes a secure area to execute biometric acquisition and storage of a registration code, public and private keys and a passcode generator created during enrollment.

In yet another embodiment of the invention, biometric prints are used to generate a registration code and cryptography keys within a secure area. The secure area is one that uses embedded software. The use of biometric prints to create passcodes within a secure area or the use of biometric prints instead of passcodes within a secure area eliminates the use of passwords or PINS to memorize and store in an insecure system. In some embodiments, a PIN and a biometric print may be required. In other embodiments, only one part of the user information may be required. In one embodiment, one or more visual images—as shown in FIG. 5B—may be selected instead of requesting a PIN or a biometric.

In another embodiment, a quantum device is used to generate physical randomness (non-determinism) that can be used to help create unpredictable asymmetric keys, registration code and passcode generator. In some embodiments, photons are used to generate physical randomness. In other embodiments, zener noise is used to generate physical randomness (non-determinism) that can be used to help create unpredictable asymmetric keys, registration code and passcode generator. In some embodiments, the zener noise is caused by an avalanche breakdown.

Figure 12:
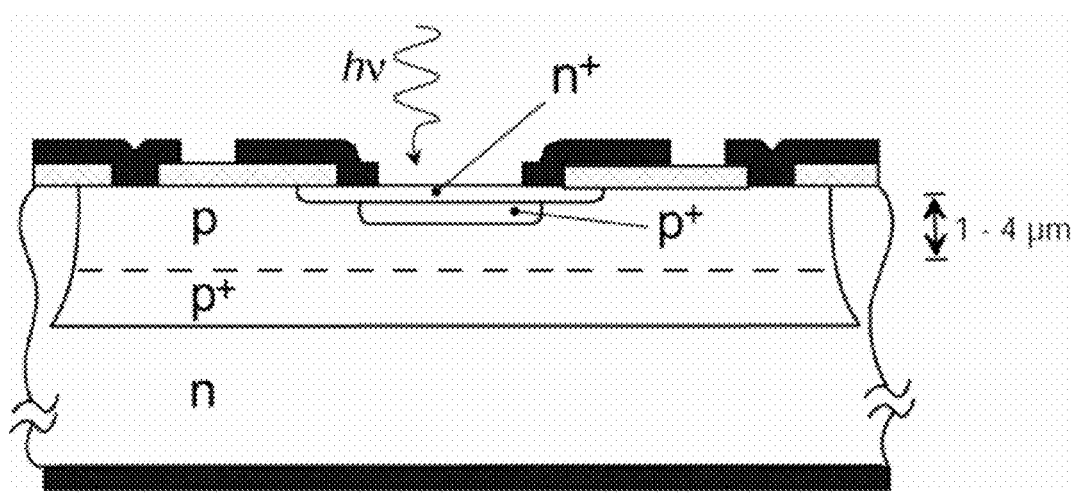
FIG. 12 shows a semiconductor device that is a photodetector. This hardware device can detect the arrival of single photons, which can be used to generate random numbers.

FIG. 12 shows a semiconductor device that is a single photon avalanche diode (SPAD). It is a solid-state photodetector based on a reverse biased p-n junction. This photodetector can detect low intensity signals of light down to a single photon. In one embodiment, an LED (light emitting diode) or OLED may be placed next to a SPAD. A SPAD is generally sensitive to photons that have a wavelength of 10 to 100 micrometers. The arrival of photons may be measured as a function of their arrival time within time intervals $[t_k, t_{k+1}]$ to generate a sequence of random bits $b=b_1 b_2 \ldots b_n$.

VOCABULARY

Figure 2A:
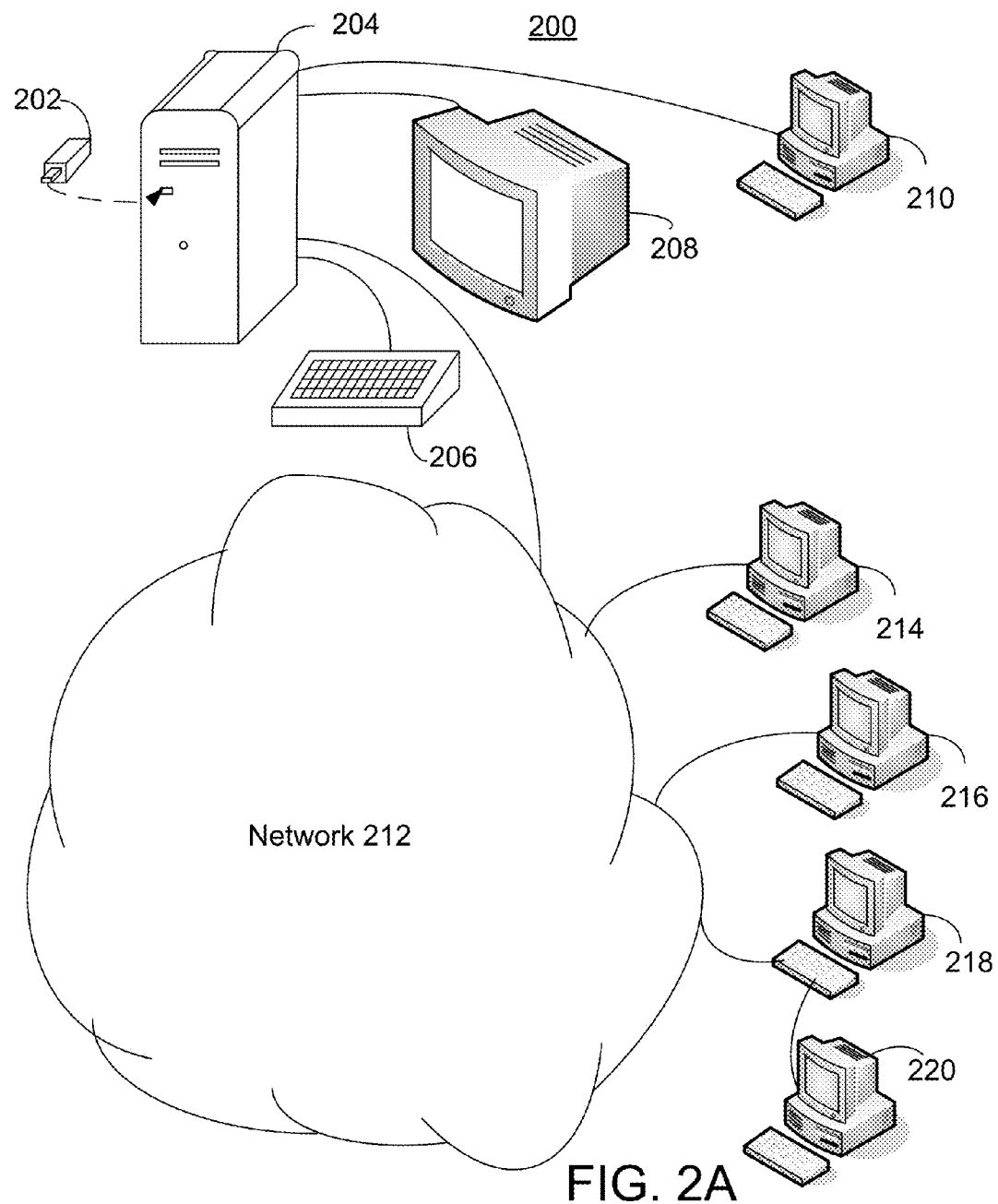
FIG. 2A shows a block diagram of an example of the system of FIG. 1A.

The word administrator refers to a computer or possibly another electronic device, or person that grants a particular user access to its resources or enables a particular event (e.g., a financial transaction, or landing a plane at an airport, and so on). In some contexts, the administrator functionality is performed by one or more backend servers. FIG. 2A shows embodiments, where computers 214, 216, 218 and 220 are backend servers along with network 212 that collectively act as the administrator.

The registration code, denoted as R, is a sequence of symbols or may be a sequence of bits. An example of a registration code with 16 symbols is 1Ae58GnZbk3T4 pcQ and a registration code with punctuation and other symbols may also be used. An example with 32 symbols is 1!56hs#KUD3__4xP*7:y2iW=K;r.+4vN? There is at least one unique registration code for each passcode generator. In an embodiment, the registration code may be a sequence of 2048 bits. The registration code is created during setup and securely given to the administrator.

The passcode, denoted as P, is a sequence of symbols. An example of an alphanumeric passcode with 8 symbols is 4zc8vNXA and an example with 16 symbols including punctuation and other symbols is &xL#WBq61!$juS_m. In an embodiment, an passcode is composed only of digits: 34902 45157. In an embodiment, each time a user submits a valid biometric print to the passcode generator, a new one-time passcode is created. The administrator checks that the passcode is derived from one of the registration codes in the database. In other embodiments, a new passcode is generated less frequently than every time a user submits a valid finger print. For example, a new passcode may be generated every other time or on a random schedule that the user is unaware of.

Figure 1A:
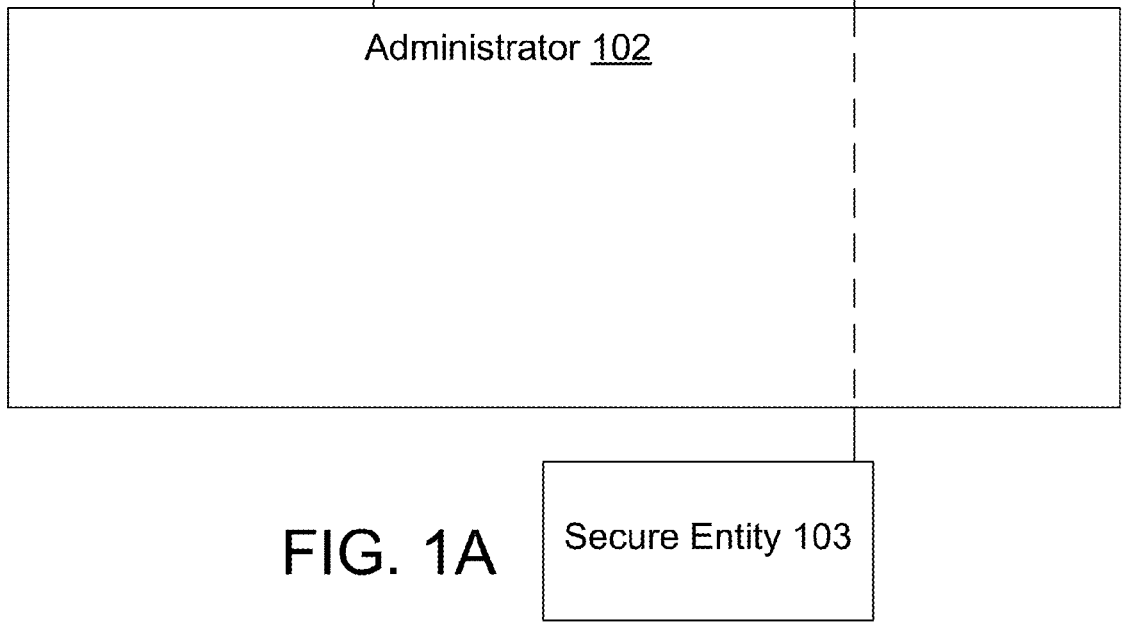
FIG. 1A shows a block diagram of an example of a system for maintaining the security of a secure entity.

The passcode generator, denoted as G, is stored in the user's secure memory in passcode device 101, shown in FIG. 1A and helps the device to generate a one-time passcode. G is also stored securely by administrator 102 so that the administrator can verify a passcode that the user submits. FIG. 3D shows an embodiment that contains passcode device 101. FIG. 4 shows an embodiment that contains passcode device 101.

The key pair (administrator key, user key)=$(L_A, K_A)$ pertains to user A. The user key $K_A$ is stored in a secure area of the user A's passcode device 101. The administrator key $L_A$ is sent to the administrator during enrollment (also called registration) and is called the administrator key for user A. When there are 5,000 users that access resources for a particular system, then there are 5,000 distinct administrator keys $K_1, K_2, \ldots, K_{5000}$ stored by the backend server(s). In this embodiment, there are 5,000 corresponding $L_1, L_2, \ldots, L_{5000}$ user keys stored in 5,000 different passcode devices 101.

A hash function, denoted $\Phi$, is a function that accepts as its input argument an arbitrarily long string of bits (or bytes) and produces a fixed-size output. In other words, a hash function maps a variable length message m to a fixed-sized output, $\Phi(m)$. Typical output sizes range from 128 to 512 bits, but can also be larger. An ideal hash function is a function $\Phi$ whose output is uniformly distributed in the following way: Suppose the output size of $\Phi$ is n bits. If the message m is chosen randomly, then for each of the $2^n$ possible outputs z, the probability that $\Phi(m)=z$ is $2^{-n}$.

In an embodiment, the hash functions that are used are one-way. A one-way function $\Phi$ has the property that given an output value z, it is computationally extremely difficult to find a message $m_z$ such that $\Phi(m_z)=z$. In other words, a one-way function $\Phi$ is a function that can be easily computed, but that its inverse $\Phi^{-1}$ is extremely difficult to compute. Other types of one way functions may be used in place of a hash function.
Hash Functions Any of a number of hash functions may be used. One possible hash function is SHA-1, designed by the National Security Agency and standardized by the NIST. The output size of SHA-1 is 160 bits. Other alternative hash functions are of the type that conform with the standard SHA-256, which produces output values of 256 bits, and SHA-512, which produces output values of 512 bits. A hash function could be one of the SHA-3 candidates, which are currently being evaluated. A candidate example of a hash function is BLAKE <http://en.wikipedia.org/wiki/BLAKE_(hash_function)>. Another example of a hash function is GrØstl <http://en.wikipedia.org/wiki/Grøstl>. Another hash function is JH <http://en.wikipedia.org/wiki/JH_(hash_function)>. Another example of a hash function is Keccak <http://en.wikipedia.org/wiki/Keccak>. Another hash function is Skein <http://en.wikipedia.org/wiki/Skein_(hash_function)>.

Hashing Information

There are different methods that may be used for hashing biometric prints, random noise from a physical process, randomness from a quantum random system and other kinds of input. As an alternative to biometric data, the input to a hashing function can even be another code. Different types of methods of hashing are appropriate for different sizes of codes, and different types of random, biometric or combination of this information that is passed to the hash function. One method is to take two different biometric prints and apply the hash function SHA-1 to each print. For ease of explanation, denote the hash function SHA-1 as $\Phi_1$. Each application of $\Phi_1$ to a fingerprint produces an output value of 160 bits. With two biometric prints, these bits are concatenated together to create a 320-bit code, called C. In some embodiments, random information created by a quantum device may not be applied to hash function. In other embodiments, the biometric information may be hashed and then combined with random information provided by a quantum device.

Another method is to use two different sections S and T of a single acquired biometric print, and produce a 320-bit code, C, by concatenating $\Phi_1(S)$ and $\Phi_1(T)$. An enhancement of this method can be used to create codes larger than 320-bits. Divide one acquired fingerprint into n sections: $S_1, S_2, \ldots, S_n$. Then concatenate the bits $\Phi_1(S_1), \Phi_1(S_2), \ldots, \Phi_1(S_n)$. This creates a code C that is 160n bits in length. For example, if the acquired fingerprint is divided into 10 sections, then this method would create a code with 1,600 bits. We remark that with other hash functions that similar concatenation methods can be used to create codes or keys that use larger amounts of bits.

Diffie-Hellman Key Exchange

A Diffie-Hellman key exchange is a key exchange method where two parties (Alice and Bob) that have no prior knowledge of each other jointly establish a shared secret key over an unsecure communications channel. Before the Diffie-Hellman key exchange is described it is helpful to review the mathematical notion of a group. A group G is a set with a binary operation *, (g*g is denoted as $g^2$; g*g*g*g*g is denoted as $g^5$), such that the following four properties hold:
(i.) The binary operation * is closed on G. In other words, a*b lies in G for all elements a and b in G.
(ii.) The binary operation * is associative on G. a*(b*c)=(a*b)*c for all elements a, b, and c in G
(iii.) There is a unique identity element e in G. a*e=e*a=a.
(iv). Each element a in G has a unique inverse denoted as $a^{-1}$. $a*a^{-1}=a^{-1}*a=e$.

The integers { . . . , −2, −1, 0, 1, 2, . . . } with respect to the binary operation + are an example of an infinite group. 0 is the identity element. For example, the inverse of 5 is −5 and the inverse of −107 is 107.

The set of permutations on n elements {1, 2, . . . , n}, denoted as $S_n$, is an example of a finite group with n! elements where the binary operation is function composition. Each element of $S_n$ is a function p:{1, 2, . . . , n}→{1, 2, . . . , n} that is 1 to 1 and onto. In this context, p is called a permutation The identity permutation e is the identity element in $S_n$, where e(k)=k for each k in {1, 2, . . . , n}.

If H is a non-empty subset of a group G and H is a group with respect to the binary group operation * of G, then H is called a subgroup of G. H is a proper subgroup of G if H is not equal to G (i.e., H is a proper subset of G). G is a cyclic group if G has no proper subgroups.

The integers modulo n (i.e., $Z_n=\{[0], [1], \ldots [n-1]\}$ are an example of a finite group with respect to addition modulo n. If n=5, [4]+[4]=[3] in $Z_5$ because 5 divides (4+4)−3. Similarly, [3]+[4]=[3] in $Z_5$. Observe that $Z_5$ is a cyclic group because 5 is a prime number. When p is a prime number, $Z_p$ is a cyclic group containing p elements $\{[0], [1], \ldots [p-1]\}$. [1] is called a generating element for cyclic group $Z_p$ since $[1]^m=[m]$ where m is a natural number such that $0 \leq m \leq p-1$ and $[1]^p=[0]$. This multiplicative notation works as follows: $[1]^2=[1]+[1]$; $[1]^3=[1]+[1]+[1]$; and so on. This multiplicative notation (i.e. using superscripts) is used in the description of the Diffie-Hillman key exchange protocol described below.

There are an infinite number of cyclic groups and an infinite number of these cyclic groups are extremely large. The notion of extremely large means the following: if $2^{1024}$ is considered to be an extremely large number based on the computing power of current computers, then there are still an infinite number of finite cyclic groups with each cyclic group containing more than $2^{1024}$ elements.

Steps 1, 2, 3, 4, and 5 describe the Diffie-Hellman key exchange.
1. Alice and Bob agree on an extremely large, finite, cyclic group G and a generating element g in G. (Alice and Bob sometimes agree on finite, cyclic group G and element g long before the rest of the key exchange protocol; g is assumed to be known by all attackers.) The group G is written multiplicatively as explained previously.
2. Alice picks a random natural number a and sends $g^a$ to Bob.
3. Bob picks a random natural number b and sends $g^b$ to Alice.
4. Alice computes $(g^b)^a$.
5. Bob computes $(g^a)^b$.

Both Alice and Bob are now in possession of the group element $g^{ab}$, which can serve as the shared secret key. The values of $(g^b)^a$ and $(g^a)^b$ are the same because g is an element of group G.

Alice can encrypt a message m, as $mg^{ab}$, and sends $mg^{ab}$ to Bob. Bob knows |G|, b, and $g^a$. A result from group theory implies that the order of every element of a group divides the number of elements in the group, denoted as |G|. This means $x^{|G|}=1$ for all x in G where 1 is the identity element in G. Bob calculates $(g^a)^{|G|-b}=(g^{|G|})^a g^{-ab}=(g^{ab})^{-1}$. After Bob receives the encrypted message $mg^{ab}$ from Alice, then Bob applies $(g^{ab})^{-1}$ and decrypts the encrypted message by computing $mg^{ab} (g^{ab})^{-1}=m$.

In some embodiments, the Diffie-Hellman key exchange may be used to securely create a common registration code for the user and the administrator Asymmetric Key Cryptography This section describes asymmetric key cryptography and defines some notation used to represent this type of cryptography. The symbol $\psi$ is used to represent the resulting of executing asymmetric key cryptography algorithm. In what follows, the notation $\psi(m, k)$ is used to represent the result of encrypting message m is with key k. In an embodiment, $\psi$ implements RSA public key cryptography, which is a type of asymmetric key cryptography.

In an embodiment, $\psi$ implements elliptic curve cryptography which is an asymmetric cryptography method. The Diffie-Hellman assumption holds for elliptic curves of the form: $y^2=x^3+ax+b$.

In an embodiment, it is assumed that E is an elliptic curve over finite field $\mathbb{F}_p$ where p is a prime number and H is a cyclic subgroup of $E(\mathbb{F}_p)$ generated by the point P that lies in $E(\mathbb{F}_p)$. Alice wants to send a message to Bob whose public key is (E, P, aP) and whose private key is the natural number a<p−1. Alice executes the following
Encryption Stage:
 1. Chose a random natural number b<p−1.
 2. Consider the plaintext message embedded as points m on E.
 3. Compute $\beta$=bP and $\gamma$=m+b(aP).
 4. Send the ciphertext Enc(E, m)=c=(l, $\gamma$) to Bob.
Decryption Stage:
After Bob receives the ciphertext c=($\beta$, $\gamma$), the plaintext m is recovered using the private key as Dec(E, c)=m=$\gamma$−a$\beta$.

The following is a simple example described here for illustrative purposes, not security purposes. Consider the elliptic curve E given by $y^2=x^3+4x+4$ over $\mathbb{F}_{13}$. It can be shown that $E(\mathbb{F}_{13})$ has 15 elements which is necessarily cyclic. Also, P=(1, 3) is a generator of E. Assuming that Bob's public key is (E, P, 4P) where a=4 is the private key and m=(10, 2) is the message that Alice wants to send to Bob, then Alice performs the following. Alice chooses b=7 at random. Then Alice calculates Enc(E, m)=Enc(E, (10, 2))=(bP, m+b(aP))=(7P, (10, 2)+7(4P))=((0, 2), (10, 2)+7(6, 6))=((0, 2), (10, 2)+(12, 5))= ((0, 2), (3, 2))=($\beta$,$\gamma$)=c. Then Alice sends ciphertext c=($\beta$, $\gamma$)=((0, 2), (3, 2)) to Bob who uses his private key to decrypt the ciphertext and recover message m=(10, 2) as follows:
Dec(E, c)=(3, 2)−4(0, 2)=(3, 2)−(12, 5)=(3, 2)+(12, 8)=(10, 2).

Some Passcode Devices

Figure 3A:
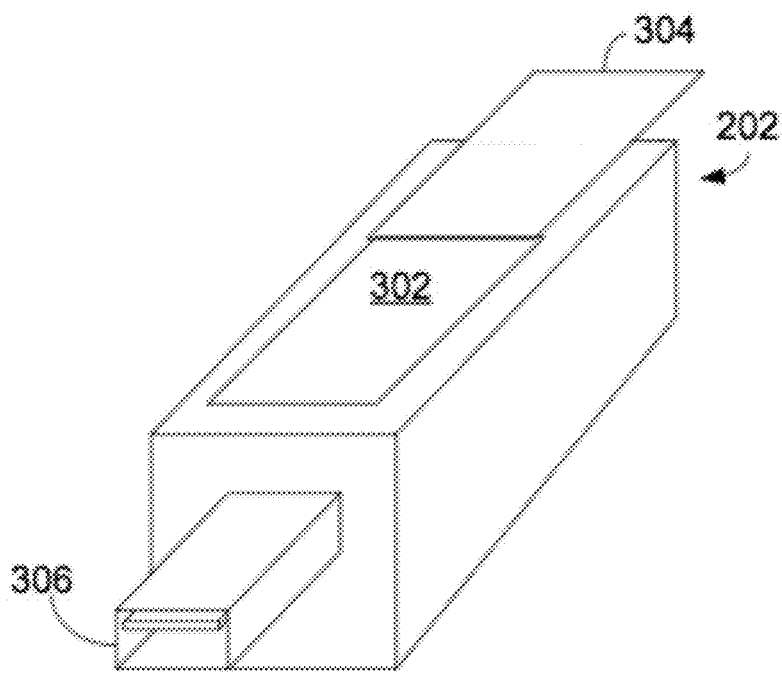
FIG. 3A shows an example of a passcode device.

In an embodiment, the passcodes are generated from a device 202 in FIG. 3A that is able to acquire biometric prints from sensor 302, store biometric print templates or images, and authenticate a newly acquired biometric print. In an embodiment, the passcode is transmitted to the bank or administrator for authentication via USB plug 306. In an alternative embodiment, the passcode is transmitted wirelessly. And in an alternative embodiment, the passcode is read from a display on the device and typed into a computer or keypad terminal.

Figure 3B:
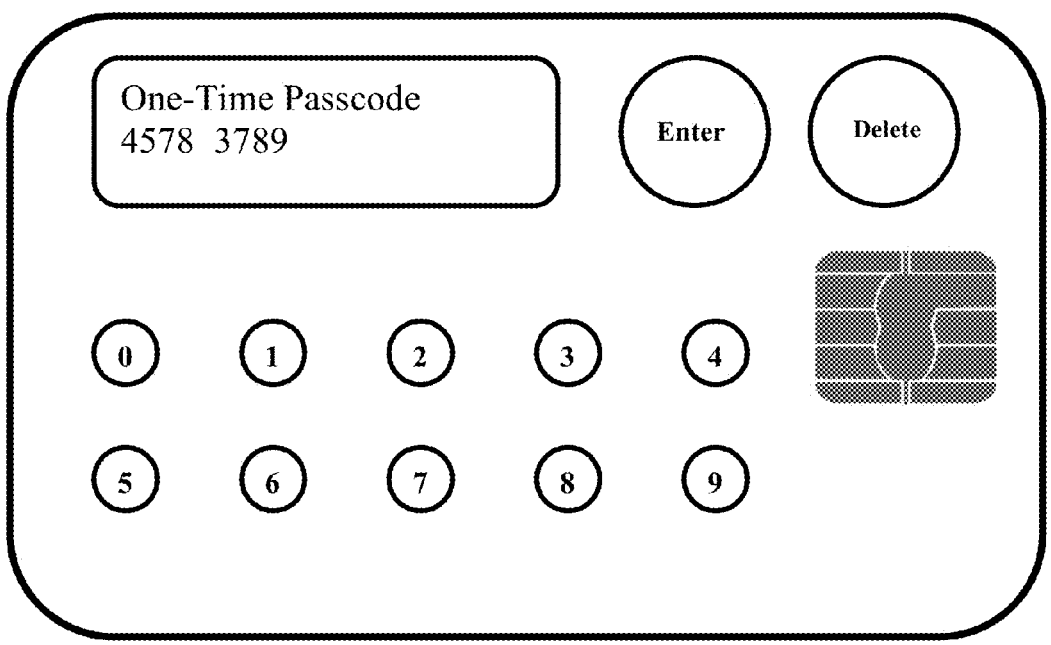
FIG. 3B shows an example of a passcode device in a smartcard embodiment.
Figure 3D:
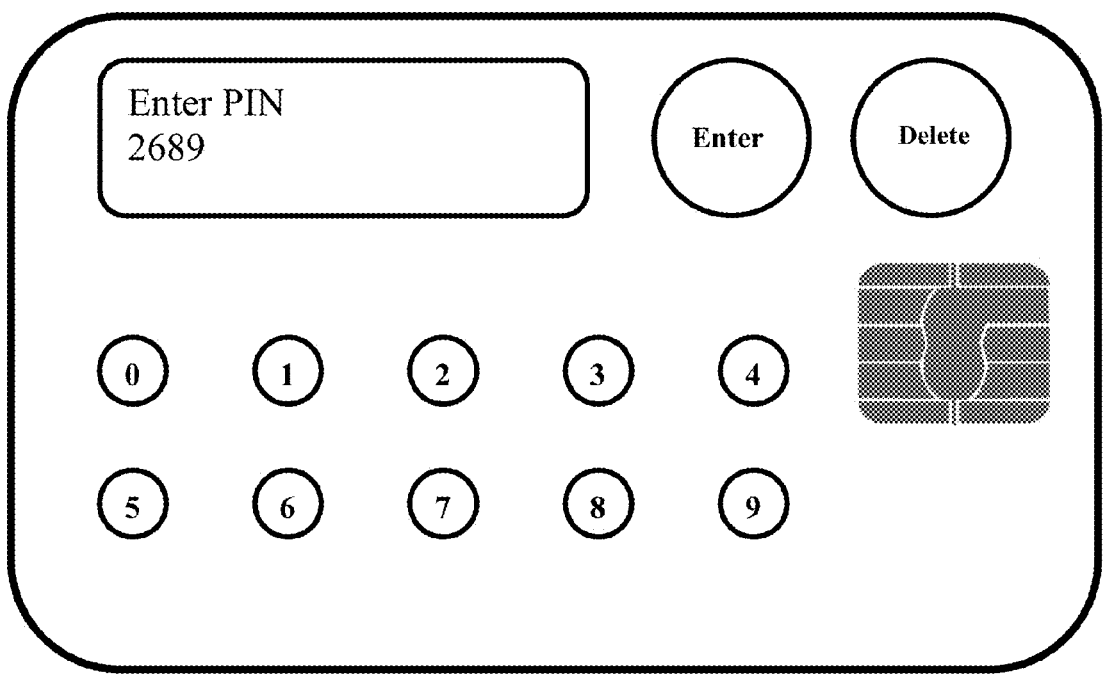
FIG. 3D shows an example of a passcode device in a smartcard embodiment where the entry of a PIN identifies the user before the next passcode is generated.
Figure 4:
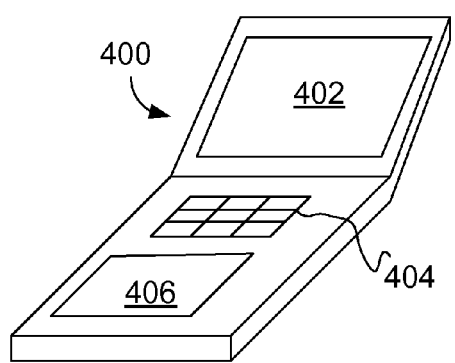
FIG. 4 shows an example of a passcode device.

In another embodiment, the device acquires a PIN or password or another type of information that the user knows as an alternative to biometric authentication as shown in FIGS. 3B, 3C and 3D. The biometric, PIN or a sequence of images that the user knows or has possession of is called user information. During biometric enrollment, one or more biometric prints are acquired, and one or more unique registration codes and cryptography keys are generated from the one or more of the biometric prints. During authentication, if the acquired biometric print is an acceptable match, then one or more unique passcodes are generated.

The software that this device executes may be embedded. In an embodiment there is no operating system on this device. In an alternative embodiment there is an operating system. The secure biometric print device has a number of components, which we describe in the next paragraph. The security of the secure area may be enhanced by any one of, any combination or of, or all of (1) the use of embedded software, (2) the lack of an operating system, and (3) the secure area being at least part of a self-contained device not connected to a computer or the internet. For example, the unit that includes the secure area may contain its own processor. In an embodiment, the secure area may not have any of these security enhancing features.

The device may contain a biometric print sensor that enables the device to scan biometric prints. The sensor may include a press sensor or a sweep sensor, for example. The device may contain a processor chip that executes all the software instructions such as acquiring a biometric print from the sensor, matching an acquired biometric print against a stored biometric print, sending communication and control commands to a display, and/or encrypting the registration code and transmitting it to the administrator when the user and administrator are not in the same physical location. By including a processor in the device the security is enhanced, because the external processor is given fewer chances to inspect contents of the device. Alternatively, the device may only store software instructions that are run by an external processor, and the external processor performs the biometric print acquisition, the encryption, and/or generation of the passcode. Alternatively, a specialized logic circuit is built that carries out the functions that the software causes the processors to perform.

In another embodiment, FIG. 3C shows a credit card requesting visual images to be selected as a method for identifying a valid user. In this embodiment, the user information are visual images that the user knows. For example, their favorite animal may be an elephant so they select an elephant.

In an alternative embodiment, the device shown in FIG. 3B is a credit card containing a smart card chip that has ten buttons for entering digits, labeled 0, 1, 2, 3, 4, 5, 6, 7, 8, 9. The credit card has a screen on it to display the one-time passcode and request a PIN. To enter the PIN 2689, the user presses the button labeled 2 first. Then the user presses button 6. Then the user presses button 8. Finally, the user presses button 9. And then the user presses the enter button. FIG. 3D shows a credit card requesting a PIN using the display screen on the card. This credit card contains a smart card chip. Entering the PIN directly into the device helps address phishing attacks.

In some embodiments, there also may be a delete button so that the user may delete an incorrect number entered during PIN entry. In some embodiments, the credit card may not have a biometric sensor. In other embodiments, the credit card may also have a biometric sensor and may also request a biometric authentication.

In some embodiments, the numbered buttons and enter and delete button may be on a USB token. The device also may contain memory, some of which may be non-volatile. The use of non-volatile memory enables the device to permanently store code generation information, such as biometric print information, executable code, registration codes, and/or the passcode generator. In some embodiments, the memory is on the processor chip. In some embodiments, the processor chip is a smart card chip. Although not necessary, in some embodiments, the sensor and processor could be integrated into a single chip. Alternatively, the sensor and the processor may be two separate chips.

In some embodiments, the physical token is located and operates inside of a mobile phone as shown in FIGS. 5A and 5B. In some embodiments a sequence of images is selected, as shown in FIG. 5B (instead of using a PIN or biometric), to authenticate the human user on the mobile phone or personal computer and then an asymmetric one-time code is generated and sent to the backend for authentication. As an example, a user may select the image of the car—as highlighted and shown in FIG. 3C—as a part of identifying the user and thus providing user information. In embodiments using a mobile phone or other mobile device such as IPad, the one-time code may be sent wirelessly via TCP/IP or via a cellular network.

By executing the biometric algorithms and visual image selection algorithms and cryptography software on a secure embedded device, the biometric prints, visual images, cryptography keys and passcode generator are less susceptible to theft; biometric information or visual image information or PIN information is not transmitted to the insecure device, nor is there any need to have encrypted templates of the biometric prints transmitted to an insecure device.

Each of the above embodiments may be used separately from one another in combination with any of the other embodiments. All of these embodiments may be used together.

DETAILED DESCRIPTION

FIG. 1A is a block diagram of an example of a system 100. System 100 includes a passcode device 101, an administrator 102, and a secure entity 103. In other embodiments system 100 may not have all of the components listed above or may have other components instead of and/or in addition to those listed above.

System 100 is an example of a system in which the security of a secure entity is kept by requiring a user to submit a passcode (e.g., a password) in order to gain access to the secure entity. The term "user" refers to someone that has access to passcode device 101. The user may use passcode device 101 to gain access to a secure entity. Any sequence of bits (which may represent any string of symbols) may be used as a passcode. In some cases, the passcode may be directly transmitted without human intervention to the administrator, so the sequence of bits may not have a visual display in standard formats such as ASCII, Unicode, and so on. For example, the first sequence of 8 bits in the passcode could in ASCII represent the end of file character, which currently does not have a visual representation. In other embodiments where the passcode is displayed as a sequence of symbols on a graphical display, then the symbols may be chosen from any subset of or combination of alphanumeric, punctuation, picture symbols, math, upper case, and/or lower case symbols, for example. The choice of alphanumeric symbols may include characters from a multiplicity of languages. An example of an alphanumeric passcode with 8 symbols 4R1pa5Wx. An example of a possible passcode with 8 symbols is ♀3ⴰ♪Ͻ‑ݣݣ☺.. An example with 16 symbols including punctuation and other symbols is &x#W Дяq61!j$uS_m.

Passcode device 101 may be used for generating passcodes and/or for setting up a new user in system 100. Setting up a new user may include "registering" the new users. Registering a new user refers to the process of adding a new user so that the new user is able to use a system, such as passcode device 101 or system 100. Passcode device 101 may have multiple other uses.

In an embodiment, passcode device 101 generates a new passcode each time a user wants to gain access to the secure entity. In an embodiment, after the passcode is used, the passcode is discarded and is not stored. In an embodiment, after a passcode is used once, the passcode will no longer enable access to the secure entity. In an embodiment, passcode device 101 also acquires and/or stores information about a user that is used for identifying the user. When the user wants to access the secure entity, the user enters at least some identifying information (e.g., a valid fingerprint) into passcode device 101. If passcode device 101 is able to match the identifying information with identifying information stored in passcode device 101, then passcode device 101 generates a passcode, which may be used for gaining entry to a secure entity (e.g., a newly acquired fingerprint may be matched with information derived from earlier acquired fingerprints).

The identifying information may be stored in passcode device 101 in association with a user ID. Thus, in this embodiment, each time a user submits identifying information to the passcode device 101, a new one-time passcode is created. An embodiment of the passcode device 101 uses a secure device (as passcode device 101) that produces unique passcodes from the identifying information, and the unique passcodes can be used as one-time passcodes. In an embodiment, for each acquired set of identifying information, the derived passcodes created are unique. In an embodiment in which the passcode may only be used once, the user does not have to remember her passcode. For example, passcode device 101 may generate a new passcode every time a user submits a valid fingerprint. In an embodiment in which a new passcode is generated for each request for access, stealing the passcode is of, at best, limited use, because after the passcode has been used, the passcode is no longer valid.

In other embodiments, passcode device 101 generates a new passcode less frequently than every time a user submits valid identifying information. For example, a new passcode may be generated every other time or on a random schedule, which the user may be unaware of. In an alternative embodiment, the passcode may be used multiple times prior to being discarded. In an alternative embodiment, the passcode is stored for a brief period of time, which may extend beyond the passcodes initial use. The discarding of the passcode may depend upon the number of uses and/or a length of period of time after the passcode was generated.

In an alternative embodiment, the frequency of repeated passcodes issued to different users is low enough such that it is unlikely that one of two users that have been issued the same passcode will try to access secure entities that only the other of the two is entitled to access. In an embodiment, the frequency of passcodes issued to the same user being repeated is low enough that it is unlikely that the interception of an old passcode will be useful to a hacker. Since the passcode is not stored beyond an expiration time, the passcode itself cannot be stolen accept during the brief period between the time the passcode is generated and the passcode expires. In an embodiment in which the passcode is valid for only one use, the passcode does not need to be stored at all and can only be stolen during the brief period between when the passcode is generated and used. In an embodiment, each time the user enters user information (e.g., a fingerprint) the current passcode is displayed or transmitted (whether or not the current passcode is a one-time passcode), and consequently, the user does not need to remember the passcode.

In an embodiment, a timestamp may be associated with a one-time passcode or other passcode. If the current time is later than the associated timestamp, when the passcode is submitted to an "administrator," then the passcode has expired, is invalid, and access would be denied. The word administrator is used to refer to an entity that grants or denies access to the secure entity.

There are many types of identifying information that may be stored by passcode device 101, such as fingerprints, a name, a birthday, a favorite number, a social security number, and/or a driver's license, a profile, an image of a face, an image of an animal, an image of a car, an iris scan, a toe print, a handprint, and/or a footprint. In an embodiment, the item used to generate the passcodes is any item that is unique. In this specification, using a first item (e.g., a fingerprint) to "generate" a second item (e.g., a passcode) may refer to using the first item to "directly" generate the second item or to "indirectly" generate the second item by, for example, first generating one or more intermediary items from which the second item is ultimately generated. The intermediary items may include a chain of multiple intermediary items that each generated one from another. In an embodiment the item used to generate the passcode is one that is difficult to fabricate, guess, find by trial and error, and/or compute. In an embodiment, the item used to generate the passcodes is uniquely associated with the user. In an embodiment, the item used to generate the passcodes has an unpredictable element to it (e.g., the unpredictable manner in which the patterns of lines in fingerprints differ between fingerprints).

During an enrollment process (also called registration) identifying information about a new user may be stored in passcode device 101. In an embodiment passcode device 101 includes a secure area for acquiring identifying information, storing the identifying information, and/or information related to, or derived from, the identifying information.

In addition, optionally, the passcode device 101 can be a standalone and/or portable device. It is more difficult for an attacker to gain access to passcode device 101 if passcode device 101 is a standalone device, because there are less opportunities for another device to inspect or otherwise access the contents of passcode device 101 compared to if passcode device 101 is not a standalone device. Additionally, in an embodiment in which passcode device 101 is a standalone device, it is more difficult for an unauthorized entity to steal the identifying information associated with the user than were passcode device 101 not a standalone device.

Administrator 102 receives the requests for access to a secure entity from passcode device 101, and decides how to handle the request. For example, administrator 102 may receive a passcode from passcode device 101 and may cause the passcode to be authenticated. In an embodiment, administrator 102 may check, or cause other entities to check, whether a passcode is derived from one of the registration codes and/or passcode generators stored in the database.

Similar to the passcode, any sequence of bits or sequence of symbols may be used as a registration code. In some cases, the registration code may be directly transmitted without human intervention to the administrator, so the sequence of bits may not have a visual display in standard formats such as ASCII, Unicode, and so on. For example, the first sequence of 8 bits in the registration code could in ASCII represent the end of file character, which currently does not have a visual representation. In other embodiments where the registration code is displayed as a sequence of symbols on a graphical display, then the symbols may be chosen from any subset of or combination of alphanumeric, punctuation, picture symbols, math, upper case, and/or lower case symbols, for example. The symbols that the user may choose from may be any subset of or combination of alphanumeric, punctuation, math, upper case, and/or lower case symbols, for example. The choice of alphanumeric symbols may include characters from a multiplicity of languages. An example of a registration code with 16 symbols is 1Ae58GnZbk3T4 pcQ and a registration code with punctuation and other symbols may also be used. An example with 32 symbols is 1!56hs#K ♀3_4xP*7:y2iW=K; r.+4vN? There may be at least one unique registration code for each user and/or passcode device 101. The same criterion and/or restrictions for both passcodes and registrations codes for determining what sequences of characters are valid.

Administrator 102 may be a human being, software, a computer, an electro-mechanical lock, or other machine that grants a particular user access to its resources and/or enables a particular event (e.g., a financial transaction, or landing a plane at an airport, and so on). Administrator 102 has the capability (e.g., authority) to grant or deny the user, associated with passcode device 101, access to the secure entity. If the passcode is found to be authentic, then administrator 102 grants the user, associated with passcode device 101, access to the secure entity. In an embodiment, the passcode is accepted by administrator 102 only once. In an embodiment, after accepting the passcode, administrator 102 expects a different passcode for the next request.

Several different embodiments are discussed above in conjunction with passcode device 101 that relate to different criterion and/or durations of time for when a passcode is valid. Administrator 102 has a corresponding way of behaving in terms of whether a given passcode is accepted depending on the embodiment. For example, in an embodiment in which the passcode is valid for only a specified number of uses (which may be a relatively small number of uses) instead of being valid for only one use, administrator 102 accepts the passcode as valid for only the specified number of times. In an alternative embodiment, the passcodes validity may be dependent on time period (which may be relatively short) instead of, or in addition to, being valid for only one or a specified number of uses. As another example, in an embodiment in which the passcode is associated with a timestamp, administrator 102 may deny access for a passcode submitted with an expired timestamp.

In an embodiment, to authenticate a passcode instead of comparing the passcode to a previously received passcode, administrator 102 generates the passcode independently from passcode device 101. Consequently, in this embodiment, instead of storing the actual passcode, administrator 102 stores a method of generating the passcode that is expected to result in the same passcode generated by passcode device 101. In an embodiment, administrator 102 stores and/or uses the same method of generating passcodes that passcode device 101 uses.

In an embodiment in which passcode device 101 and administrator 102 use the same method for generating a passcode, the registration process may involve associating a particular method of generating passcodes with a user and/or passcode device 101. The registration process may involve synchronizing the methods used by passcode device 101 and by administrator 102 so that at a particular attempt to gain access, administrator 102 and passcode device 101 generate the same passcode. The registration process may involve associating a particular registration code (which may also be referred to as a seed) with a particular user and/or passcode device 101. Administrator 102 may be part of the secure entity, a separate entity, and/or may be located in location that is remote from the secure entity.

Secure entity 103 is the secure entity that the user (which is associated with passcode device 101) desires to access. Secure entity 103 is the entity to which administrator 102 has the capability to determine whether the user is entitled to access. Some examples of secure entities are locks, doors, cars, houses, websites, bank accounts, ATMs, medical records, authorization to perform a financial transaction, or some other type of event that requires security.

The lines connecting passcode device 101, administrator 102, and secure entity 103 represent paths of communication. These lines may represent physical communication lines, wireless communications, sonar communications, verbal communications, and/or other communications. The dashed part of the line connecting passcode device 101 with secure entity 103 indicates the capability of administrator 102 to prevent or allow access to secure entity 103.

Although in FIG. 1A only one passcode device 101, administrator 102, and secure entity 103 are illustrated, there may be a multitude of passcode devices 101 that can access secure entity 103 and each passcode device 101 may be able to access multiple secure entities 103. Similarly, there may be several administrators 102 that are capable of granting access to a particular secure entity 103, and each administrator may be capable of granting access to several secure entities 103. Further, a particular passcode device 101 may have a choice of several administrators 102 via which to gain access to a particular secure entity 103.

Figure 1B:
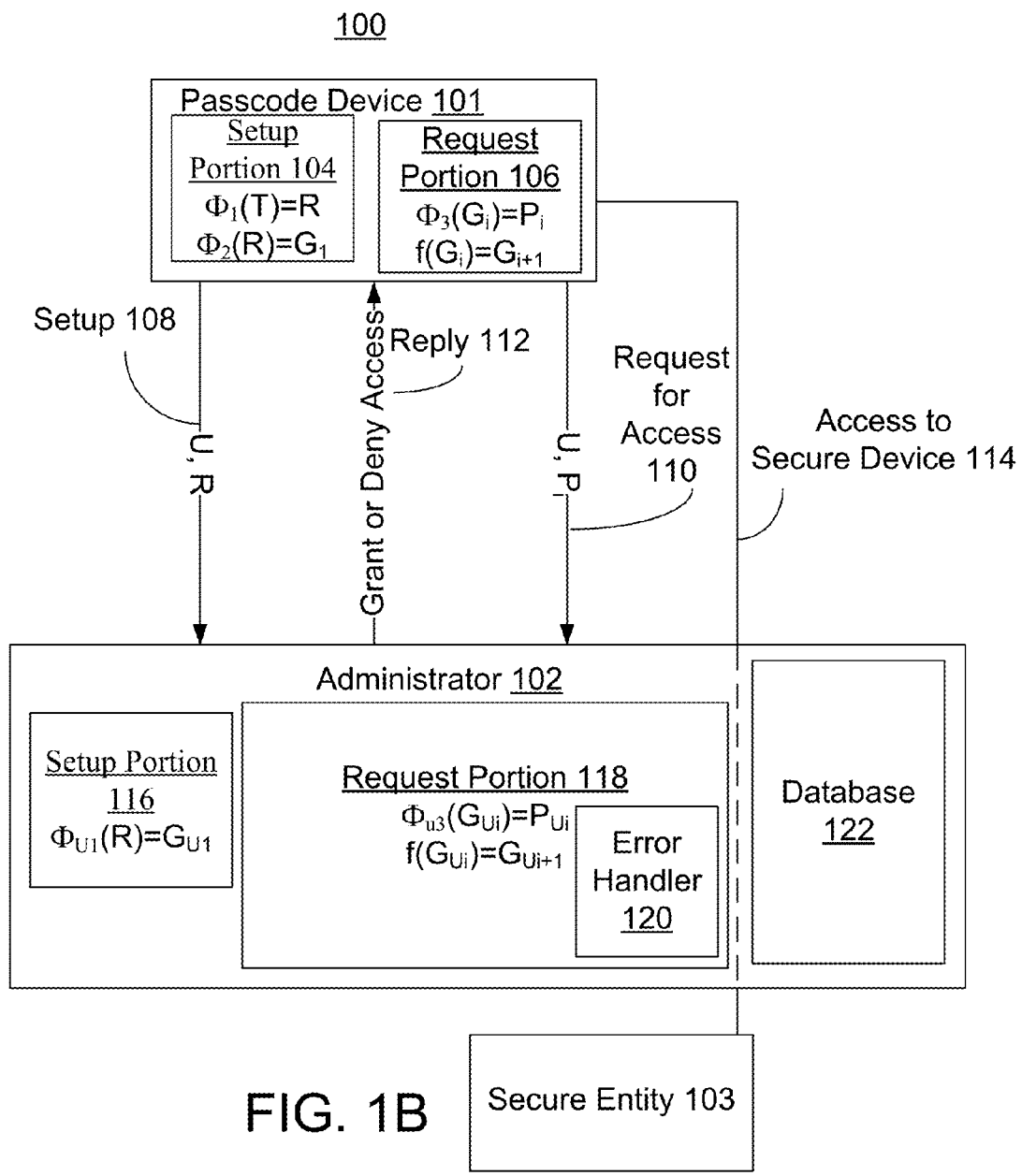
FIG. 1B shows a block diagram of an example of the system of FIG. 1A.

FIG. 1B shows one of many possible embodiments of system 100. In the embodiment of FIG. 1B, passcode device 101 includes setup portion 104 and request portion 106. In the embodiment of FIG. 1B, system 100 includes setup 108, request for access 110, reply 112, access to secure device 114, and administrator 102. Administrator 102 may include setup portion 116 and request portion 118. Request portion 118 may include error handler 120. In other embodiments system 100 may not have all of the components listed above or may have other components instead of and/or in addition to those listed above.

In FIG. 1B, each passcode, denoted as $P_i$, is a sequence of bits or a sequence of symbols. Although this specification uses a specific notation, the invention is in no way limited by this notation. Software implementing the methods of this specification may use a notation that is unrelated to the notation used in this specification. Setup portion 104 may be used for registering a new user, configuring passcode device 101, and/or for setting up passcode device 101. Setup portion 104 acquires identification information, T. In an embodiment, setup portion 104 may generate a registration code, which may be denoted as R, for the sake of registering the user with another entity.

In an embodiment, a method, $\Phi_1$, may be used for generating registration code R from the identification information. The method $\Phi_1$ (which may be referred to as a generating method) may be a "one-way" method such as a one-way algorithm, a one-way function, and/or another one-way method. For example, the registration code may generated according to the equation $\Phi_1(T)=R$. A one-way method, herein denoted $\Phi_1$ (possibly having one or more indices representing different functions associated with different users or applications), has the property that given an output value z, it is computationally extremely difficult to find the input $m_z$ such that $\Phi_1(m_z)=z$. In other words, a one-way method is a method $\Phi_1$ that can be easily computed, but whose inverse $\Phi_1^{-1}$ is extremely difficult (e.g., impossible) to compute. One way to quantify the difficulty to compute $\Phi_1$ given an output z, is to use the number of computations that are expected to be required to compute and/or guess $\Phi_1$. For one type of method, it is expected to take between $O(2^{n/2})$ and $O(2^n)$ computational steps to find or guess $m_z$, (depending on the how clever the one performing the computations is) where n is the number of bits in the output z. By using a one-way method for computing the registration code, even if the registration code is intercepted or otherwise stolen, it is unlikely that the registration code can be used to discover identifying information T.

One set of methods that may be used are one-way functions in which finding the inverse involves an operation that is mathematically indeterminate, impossible, intractable, or computationally impractical or difficult. For example, one method is to use a collection of step functions each of whose domain and range is [0, 1, 2, . . . 255] and apply a distinct step function to a part of T. The information from T could be used to determine which step functions to select from the collection. If 16 step functions are chosen from the collection, then this would create an output of 128 bits. If n step functions are chosen from the collection, then this would create an output of 8n bits. An alternative to this would be to construct 32 matrices resulting from the step functions and compute the determinant modulo 256 for each of the 32 matrices. This creates a one-way function whose output is 256 bits. As another example, method $\Phi_1$ could involve first represent user information T by a string of digits. Then, each digit of the string of digits could be multiplied by a corresponding digit from another string of digits, where at least one digit of the other string has a value of zero. The inverse of this method would involve at least one division by zero for each multiplication by a digit with the value of zero, which has no inverse, and consequently this method would be also be one-way. Similarly, functions for which finding their inverses involves computing a non-convergent series or non-convergent integral are other examples of classes of functions that may be used as one-way functions.

Another class of one-way functions involves computations that cause a loss of information or a discarding of selected pieces of information. Since some of the input information is lost in computing this class of one-way functions, the original input information (e.g., identifying information T) is difficult and may be impossible to recover. For example, a one-way function may be constructed by first performing a randomizing operation such as discarding random bits of information from the input, adding random bits of information to the input, and/or performing another randomizing operation to the input, and then another function may be applied to the information retained. Similarly, the same randomizing operations may be performed on the output of the function.

In an embodiment, a one-way hash function is used as method $\Phi_1$. A hash function is one that accepts as its input argument an arbitrarily long string of bits (or bytes) and produces a fixed-size output. In other words, a hash function maps a variable length input m to a fixed-sized output, $\Phi_1(m)$. Typical output sizes range from 128 to 512 bits, but can also be larger. An ideal hash function is a function $\Phi_1$ whose output is uniformly distributed in the following way. For example, suppose the output size of $\Phi_1$ is n bits. If the input m is chosen randomly, then for each of the $2^n$ possible outputs z, the probability that $\Phi_1(m)=z$ is $2^{-n}$. This is a definition of an ideal hash function.

A real hash function with output size n bits should have the property that probability of each of its $2^n$ possible outputs can be compared against the ideal probability of $2^{-n}$. The chi-square function on n−1 degrees of freedom is a useful way to measure the quality of a real hash function. One uses a chi-square on n−1 degrees because there are n bits of output. And then one can compute a confidence level that the real hash function is close to an ideal hash function. Some typical confidence levels could be 90%, 95%, 99%, 99.5% and 99.999% depending on the level of security desired. In an embodiment, the hash functions that are used are one-way. Other types of one-way functions or methods may be used in place of a hash function. In an embodiment, the hash functions that are used are one-way. Other types of one-way functions or methods may be used in place of a hash function.

Setup portion 104 uses registration code R and a method $\Phi_2$, which may be a one-way function, to generate an initial passcode generator $G_1$. Initial passcode generator $G_1$ may be used for generating an initial passcode. A passcode generator, also known as a seed, can be a string of characters or other form of a code similar to registration code R or a passcode. Passcode generators may be stored securely by administrator 102 for use in verifying a passcode that is submitted by passcode device 101. The initial passcode generator $G_1$ may be generated according to the equation $\Phi_2(R)=G_1$. Method $\Phi_2$ (which also may be referred to as a generating method) may be the same as, or different from, method $\Phi_1$.

In some embodiments, setup portion 104 may also use random information T generated from the semiconductor shown in FIG. 12 to create registration code R=Φ(T). Setup portion 104 also uses asymmetric cryptography method ψ and user key $K_A$ where the subscript A indicates user A.

Using passcode generators, such as $G_1$, enables the identification of a person without having access to the user's identifying data, such as the user's biometric data (e.g., fingerprints) or social security number or other identifying data. For example, some citizens and organizations are concerned about the government and other institutions storing a person's biometric data. Using a passcode generator, such as $G_1$, an institution can identify a person with a unique registration or passcode, which is derived from his or her fingerprint, other biometric data, and/or other authentication data.

Request portion 106 requests access to a secure device. In an embodiment, request portion 106 generates a passcode, which may be used for requesting access to a secure entity. For example, request portion may use a method, $Φ_3$, and a generator, $G_i$, for generating a passcode $P_i$. Method $Φ_3$ may be a one-way method such as a one way function, similar to method $Φ_2$. Method $Φ_3$ (which may be referred to as a generating method) may be the same as or different from methods $Φ_1$ and/or $Φ_2$. For example, request portion 106 may compute a passcode using the equation, $Φ_3(G_i)=P_i$. The index i is used to indicate the ith passcode $P_i$, which in an embodiment is generated by the ith request for a passcode. In an embodiment, each passcode, $P_i$, is generated by using a different generator $G_i$. In an embodiment, each new generator, $G_{i+1}$, may be generated from a prior generator, $G_i$, using a method f, according to the equation, $f(G_i)=G_{i+1}$, for example.

In some embodiments, request portion 106 may use the rounded time l to compute the next passcode as $Φ_3(G_i, l)=P_i$.

Setup 108, request for access 110, reply 112, and access to secure device 114 are different forms of communications in which passcode device 101 participates. Setup 108, request for access 110, and reply 112 are embodiments of the communications represented by the lines connecting passcode device 101, administrator 102, and secure entity 103 in FIG. 1B. In an embodiment, passcode device 101 may send registration code R to another entity, when sending setup 108. In an embodiment, passcode device 101 sends a user ID U with the registration code R to another entity or elsewhere as part of setup 108. Alternatively, passcode device 101 receives the user ID U from the other entity or from elsewhere. Request access 110 is a request for access to secure device 103. Request 110 may include sending encrypted passcode $ψ(P_i, K_A)$, for example. In an embodiment, user ID U is also sent as part of request 110.

Reply 112 is a reply to request 110. Reply 112 may include a grant or a denial of request 110 for access to secure entity 103. In an embodiment, administrator 102 receives registration codes R from passcode device 101 as part of setup 108, and receives requests for access to a secure device from passcode device 101, as part of request 110. In an embodiment, administrator 102 may also grant or deny access to a user associated with passcode device 101, as part of reply 112. Access to secure device 114 are communications between passcode device 101 and secure entity 103. Access to secure entity 114 can be blocked from occurring or allowed to occur by administrator 102.

Administrator 102 includes setup portion 116, which uses registration code R received from passcode device 101, to generate the initial passcode generator $G_1$. In alternative embodiments, setup portion 116 may be located outside of administrator 102. Since administrator 102 may service several passcode devices 101 and/or several users, user ID U may be used to associate a registration code R, the generators $G_i$, and the passcodes generated with a passcode device 101 and/or a user U, which may be written as $R_U$ and $G_{Ui}$, respectively. In this notation, the index U distinguishes the registration code $R_U$ and generator $G_{U1}$ of user U from the registration code and generators of other users. Registration code $R_U$ denotes registration code R after having been associated with user U at the administrator's side.

Since administrator 102 may need to authenticate the passcode submitted by passcode device 101, administrator 102 may need to generate the same set of passcodes as passcode device 101 in order to perform the authentication. Administrator 102 may generate the passcodes generated by passcode device 101 by using the same methods (e.g., one-way functions such as one-way hash functions or random number generators) and generators as used by passcode device 101. Consequently, administrator 102 uses method $Φ_{U2}$ to generate an initial passcode generator $G_{U1}$. Method $Φ_{U2}$ may be the same for all U as long as the registration codes $R_U$ are different for each of the U's. In an embodiment, methods $Φ_{U2}$ are in general different for each U. If methods $Φ_{U2}$ are different, then the $R_U$'s do not need to necessarily be different so long as the resulting passcodes for different users are in general different. The passcodes of different users can be different if methods $Φ_{U3}$ or passcode generators $G_{Ui}$ are different for different users, while the $G_{Ui}$'s will be different for different users if methods $Φ_{U2}$ and/or $R_U$ are different.

Similar to passcode device 101, administrator 102 may generate the initial passcode generator $G_{U1}$ according to the equation $Φ_{U2}(R_U)=G_{U1}$. In an embodiment, for a given authorized user U, $Φ_{U2}$, $R_U$, and $G_{U1}$ are the same as $Φ_2$, R, and $G_1$.

Administrator 102 also includes request portion 118. In alternative embodiments, request portion may be located outside of administrator 102. For example, request portion 118 may be stored and executed on a system having a database that stores information being accessed. Request portion 118 receives, via request 110, encrypted passcode $ψ(P_i, K_A)$ and user ID U from request portion 106 of passcode device 101. Database 122 may be part of administrator 102, as illustrated in FIG. 1B, or may be located elsewhere. Database 122 may store current passcode generators and/or other user information such as the administrator key $L_A$ for user A. In an embodiment, based on user ID U, request portion 118 receives a passcode generator and administrator key $L_A$ from database 122, and then decrypts $ψ(P_i, K_A)$ using cryptography method ψ and key $L_A$ and then also generates a passcode that is compared with the decrypted passcode $ψ(ψ(P_i, K_A), L_A)=P_i$ received from the passcode device. The passcode $Π_i$ generated is expected to be the same (after decryption is performed by the administrator using administrator key $L_A$ and cryptography method ψ) as the decrypted passcode $P_i$ that user U sent encrypted as $ψ(P_i, K_A)$ with the current request if user U is an authorized user.

For example, request portion 118 may use method $Φ_{U3}$ and a passcode generator, $G_{Ui}$, for generating a passcode $P_{Ui}$. Method $Φ_{U3}$ may be the same as or different from method $Φ_{U2}$. For example, request portion computes a passcode using the equation, $Φ_{U3}(G_{Ui})=P_{Ui}$. Each passcode, $P_{Ui}$, is generated by using a different passcode generator $G_{Ui}$. Each new passcode generator, $G_{Ui+1}$, may be generated from a prior passcode generator, $G_{Ui}$, using method $f_U$, according to the equation, $f_U(G_{Ui})=G_{Ui+1}$, for example. Request portion 118 compares passcode $P_{Ui}$ to passcode $P_i$ and if passcode $P_{Ui}$ and passcode $P_i$ are the same, authorization to access to secure entity 103 is granted from request portion 118 of administrator 102, via reply 112, to the user associated with passcode device 101.

Methods $\Phi_{U3}$ and $f_U$ may be the same for all U as long as the passcode generators $G_{Ui}$ and $G_{Ui+1}$ are different. In an embodiment, methods $\Phi_{U3}$ and $f_U$ are in general different for different U. In an embodiment, for a given authorized user U, $\Phi_{U3}$, $f_U$, $G_{Ui}$, and $G_{Ui+1}$ are the same as $\Phi_3$, f, $G_i$, and $G_{i+1}$, respectively, except that $\Phi_{U3}$, $G_{Ui}$, and $G_{Ui+1}$ are generated in association with administrator 102 and $\Phi_3$, f, $G_i$, and $G_{i+1}$ are generated at passcode device 101. Setup portion 116 and request portion 118 may be separate portions of code, such as objects, subroutines, functions, and/or methods. Setup portion 116 and request portion 118 may not be separate portions of code, but may be lines of code intermingled with one another and/or other parts of administrator 102.

Figure 1C:
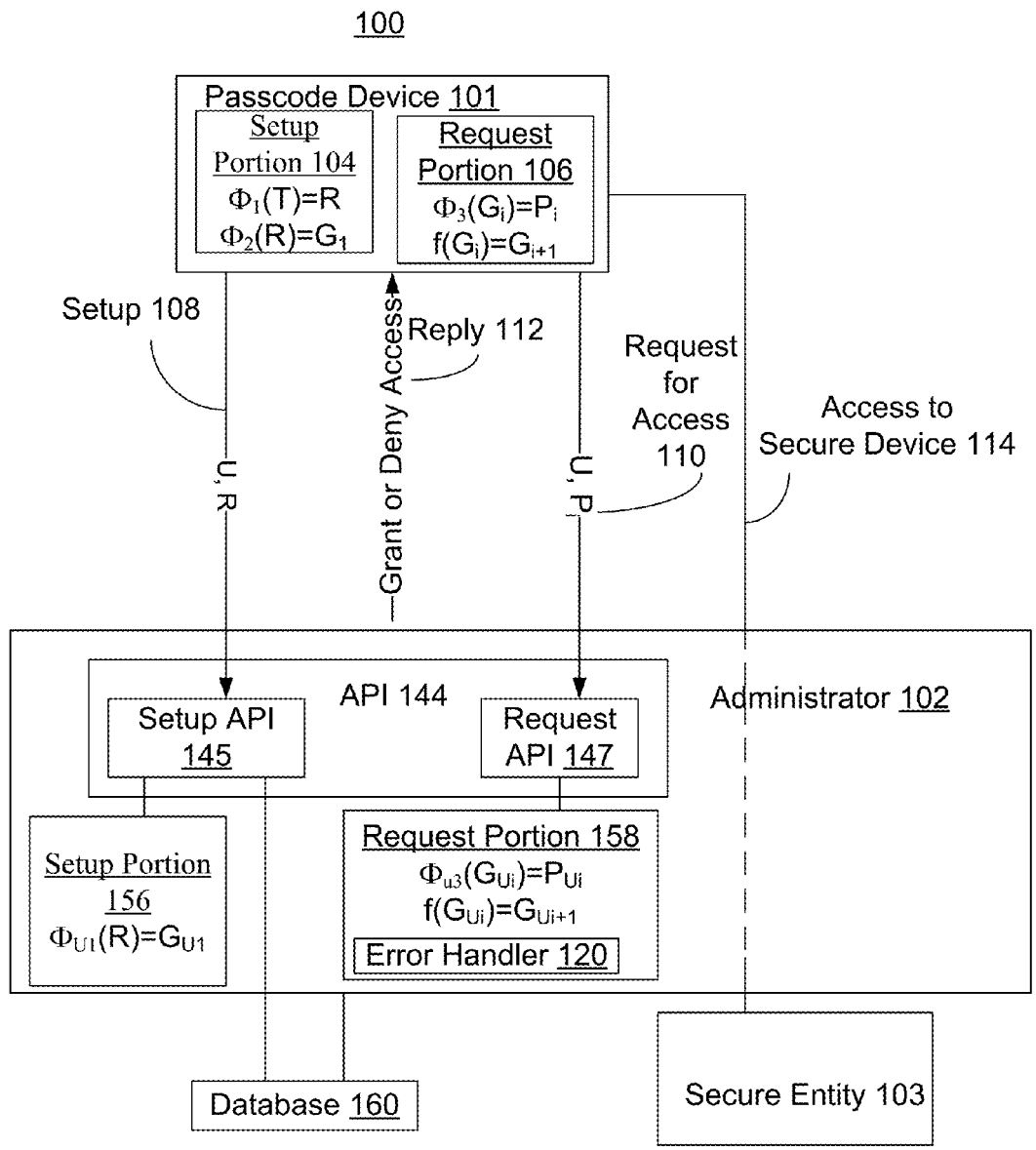
FIG. 1C shows a block diagram of an example of the system of FIG. 1A.

FIG. 1C shows one embodiment of system 100. In the embodiment of FIG. 1C, passcode device 101 includes setup portion 104 and request portion 106, similar to the embodiment of FIG. 1B. In the embodiment of FIG. 1C, system 100 includes setup 108, request for access 110, reply 112, and administrator 102. Administrator 102 includes API 144, which may include setup API 145, request API 147. Administrator 102 may also include setup portion 156, and request portion 158. As in FIG. 1B, in FIG. 1C system 100 also includes database 160 and secure entity 103. Request portion 158 may include error handler 120. In other embodiments of FIG. 1C, system 100 may not have all of the components listed above or may have other components instead of and/or in addition to those listed above.

Passcode device 101, administrator 102, and secure entity 103 were explained in conjunction with FIG. 1A. Setup portion 104 (of passcode device 101), request portion 106 (of passcode device 101), setup 108, request for access 110, reply 112, and request for access 110 were also explained above in conjunction with FIG. 1B. Setup portion 156, request portion 158, database 160 function in essentially the same manner as setup portion 116, request portion 118, database 122 (FIG. 1B). However, setup portion 156, request portion 158, database 160 are numbered differently from setup portion 116, request portion 118, database 122 (FIG. 1B), because their locations in FIG. 1C are different than in FIG. 1B, and consequently their operations may have differences that relate to their different locations.

In some applications (e.g., an electronic lock for a car), system 100 may not need a database, because the amount of information being stored is relatively small. Other applications, such as accessing a bank account, may have many users and may require the storing of information associated with system 100 in a database. Some institutions may not mind establishing a new database for storing information associated with system 100 when installing system 100. However, other institutions, such as banks, may already use one or more databases. Institutions that already have at least one database may not be interested in maintaining another separate database for the user information associated with system 100, and may prefer to store the user information associated with system 100 in their current database. API 144, setup API 145, and/or request API 147 may communicate with a database for storing and retrieving user information.

To explain API 144, in an embodiment, API 144 is located within administrator 102, and communicates with passcode device 101 and database 160. In an embodiment in which administrator 102 is a human (and in other embodiments), API 144 may be external to the rest of administrator 102. Setup API 145 is the interface through which the user, passcode device 101, or a human administrator setup and/or register new user. Request API 147 is the interface through which a user, passcode device 101, or a human administrator request access to secure entity 103. Setup API 145 and request API 147 may share the same fields for entering data or may use different fields. Similarly, setup API 145 and request API 147 may not be distinct modules, but may be different portions of code within administrator 102 and/or API 144 and may be parts of the same module. Alternatively, the lines of code that make setup API 145 and request API 147 may be intermingled with one another, and/or with the rest of administrator 102. Setup API 145 and request API 147 may be any combination of hardware and software. The software portion of setup API 145 and request API 147 (if present) may be written using any of a number of scripts and/or computer languages such as PHP, JSP, a web interface that calls JavaScript routines, C, Perl, TCL, Pascal, and/or Basic.

In an embodiment, setup API 145 and request API 147 may be capable of handling both clients that prefer to use preexisting database, such as database 160, and those that prefer to use a newly established database, facilitating a quick integration of system 100 into a pre-existing system and thereby reducing the financial costs of integration. In an alternative embodiment, a different setup API 145 and/or request API 147 are used depending upon whether the customer intends on using their own database or allowing administrator 102 to setup a database.

To explain setup API 145 in conjunction setup portion 156, setup API 145 may cause user information, such as passcode generators $G_{Ui}$ to be stored in database 160. Setup API 145 may cause methods $\Phi_{U2}$ and/or $\Phi_{U3}$ to be stored within administrator 102 for use by setup portion 156. Methods $\Phi_{U2}$, $\Phi_{U3}$, and/or $f_U$ may also be stored within administrator 102 for use by setup portion 156.

Request portion 158 may contain proprietary executable code that receives a passcode from request API 147. Request portion 158 may determine whether passcode $P_i$ is valid or not.

Regarding database 160, database 160 may have existed prior to the installation of system 100, and may store a variety of different types of information, some of which may have not have any relationship to granting access to the secure entity 103. When configuring system 100 or when setting up a new user, if database 160 already exists and already has a records for the user of interest, system 100 may add a field to the record for a user ID U and for a passcode generator $G_{Ui}$. In an alternative embodiment, database 160 is within administrator 102, and is installed with and/or after administrator 102.

Putting the together the above discussion of API 144, setup portion 156 and request portion 158, and database 160, a registration code R, user key K and administrator key L may be based upon (e.g., copied from or received as) output from passcode device 101 and optionally may also be based on other user information that is entered into the setup API 145. Setup API 145 calls setup portion 156 and passes registration code R and administrator key L as arguments, where registration code R and administrator key L is received by setup portion 156.

In an embodiment, setup portion 156 determines if registration code R is valid, and sends a valid or invalid message back to setup API 145. The determination of whether registration code R is valid may be a determination as to whether registration code R fits a particular format. If administrator 102 stores a copy of the user information from which registration code was derived, then the determination as to whether registration code is valid may include generating the registration code at registration portion 156, comparing the generated registration code with the received registration code. Determining whether registration code R is valid may involve verifying that the user associated with registration code R exists, determining whether user ID U is valid, and/or verifying other user information that registration portion 156 has access to. Determining whether registration code R is valid may involve administrator 102 sending a communication to passcode device 101 or the associated user confirming that the registration code was sent. If valid, the setup API 145 also sends a passcode generator $G_{Ui}$ (generated from registration code R) and may optionally send other user information, such as the user ID U, to database 160.

When a user would like to access secure entity 103, a passcode $P_i$ is entered into, transmitted to, and/or received by request API 147 based on output from passcode device 101. Request API 147 calls request portion 158, using passcode $P_i$ as an argument. User ID U may be encoded within passcode $P_i$, and request portion 158 may extract user ID U from passcode $P_i$. Request portion 158 may return user ID U to request API 147. If passcode $P_i$ is invalid, request portion 158 may return an invalid user ID U. Alternatively, instead of request portion 158 extracting the user ID U from passcode $P_i$, the user may enter user ID U into request API 147, or request API 147 may receive user ID U from passcode device 101.

Administrator 102 uses user ID U as a database index for the purpose of retrieving passcode generator $G_{Ui}$ from the database 160. If user ID U is an invalid index, then administrator 102 sends an invalid message to request API 147. If user ID U is a valid index, then the administrator 102 sends passcode generator $G_{Ui}$ to request API 147. Request API 147 calls request portion 158, and sends two arguments, passcode $P_i$ and passcode generator $G_{Ui}$, which are received by request portion 158. Request portion 158 determines whether passcode $P_i$ and passcode $G_{Ui}$ match. If passcode $P_i$ and passcode $G_{Ui}$ match, then request portion 158 returns a valid message and the updated passcode generator $G_{Ui+1}=f(G_{Ui})$ to the request API 147. Administrator 102 stores passcode generator $G_i$ or an updated version of passcode generator $G_{Ui+1}$ in database 160, such that passcode generator $G_i$ or its updated version is indexed by user ID U. However, if passcode $P_i$ and passcode generator $G_{Ui}$ do not match, the request portion 158 returns an invalid message to request API 147. Then request API 147 may send an invalid message to the user U, a human administrator, and/or passcode device 101.

FIG. 2 shows an example of an embodiment of a secure system 200. Secure system 200 includes passcode device 202, computer 204 having input system 206 and output system 208. Secure system 200 also includes system 210, network 212, system 214, system 216, system 218, and system 220. In other embodiments secure system 200 may not have all of the components listed above or may have other components instead of and/or in addition to those listed above.

Secure system 200 illustrates some of the variations of the manners of implementing system 100. Passcode device 202 is one embodiment of passcode device 101. Passcode device 202 is capable of being plugged into and communicating with computer 204 or with other systems via computer 204. Passcode device 202 also may communicate wirelessly with computer 204. A user may use input system 206 and output system 208 to communicate with passcode device 101.

Computer 204 is directly connected to system 210, and is connected, via network 212, to system 214, system 216, and system 218, which is connected to system 220. Network 212 may be any one or any combination of one or more Local Area Networks (LANs), Wide Area Networks (WANs), wireless networks, telephones networks, and/or other networks. System 218 may be directly connected to system 220 or connected via a LAN to system 220. Administrator 102 may be any of, a part of any of, or any combination of any of computer 204, system 210, network 212, system 214, system 216, system 218, and/or system 220. Secure entity 103 and may be any of, a part of any of, or any combination of any of system 210, network 212, system 214, system 216, system 218, and/or system 220. For example, administrator 102 may be located on system 214, and secure entity 103 may be located on system 216. As another example, administrator 102 may be located on computer 204, and secure entity 103 may be located on system 210, 214, system 216, system 218, system 220, and/or network 212. As yet another example, administrator 102 and secure entity 103 may both be located on system 216 or may both be located on system 210. As another example, system 218 may be administrator 102, and system 220 may include secure entity 103.

Figure 2B:
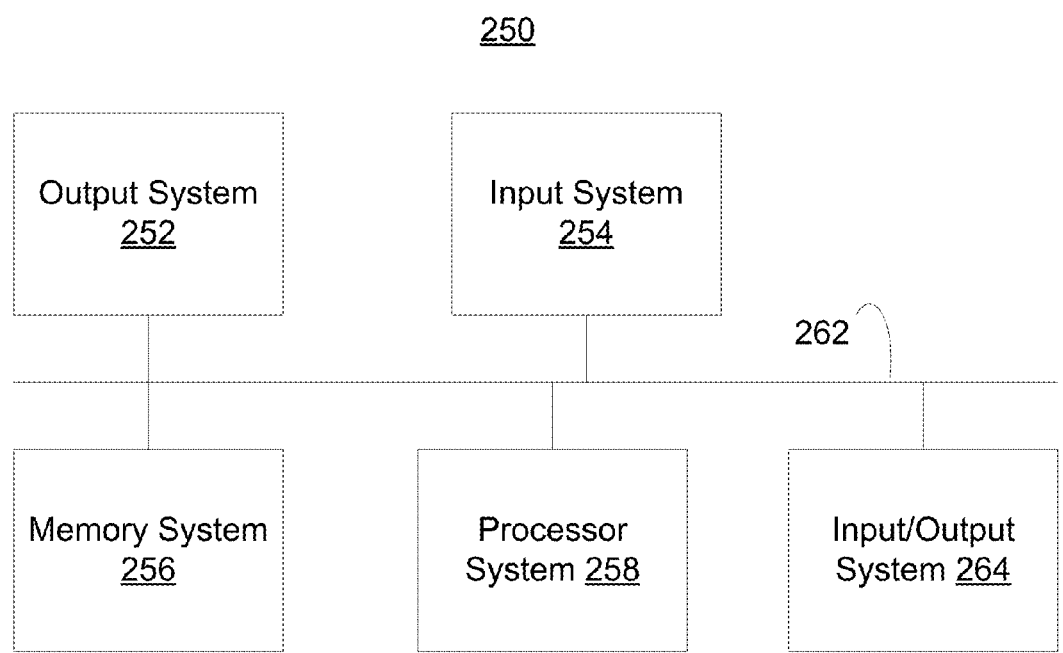
FIG. 2B shows a block diagram of an example of computer system, which may be used as any of the system of FIG. 2A and/or for any of the blocks in FIG. 1A.

FIG. 2B shows a block diagram of a computer system 250 used in system 100. Computer system 250 may include output system 252, input system 254, memory system 256, processor system 258, communications system 262, and input/output device 264. In other embodiments, computer system 250 may not include all of the components listed above or include other components in addition to and/or instead of those listed above.

Computer system 250 is an example of a system that may be used for any one of, any combination of, or all of computer 204, system 210, system 214, system 216, system 218, and/or system 220.

Output system 252 may include any one of, some of, any combination of, or all of a monitor system, a handheld display system, a printer system, a speaker system, a connection or interface system to a sound system, an interface system to peripheral devices and/or a connection and/or interface system to a computer system, an intranet, and/or an internet, for example.

Input system 254 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 256 may include, for example, any one of, some of, any combination of, or all of a long term storage system, such as a hard drive; a short term storage system, such as random access memory; a removable storage system, such as a floppy drive, jump drive or other removable drive; and/or flash memory. Memory system 256 may include one or more machine-readable mediums that may store a variety of different types of information.

The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. For example, embedded software is stored on a machine-readable medium. The term machine-readable medium also includes mediums that carry information while the information is in transit from one location to another, such as copper wire, air, water, and/or optical fiber. Software versions of any of the components of FIGS. 1A-C may be stored on machine-readable mediums.

Processor system 258 may include any one of, some of, any combination of, or all of multiple parallel processors, a single processor, a system of processors having one or more central processors, and/or one or more specialized processors dedicated to specific tasks.

Communications system 262 communicatively links output system 252, input system 254, memory system 256, processor system 258, and/or input/output system 264 to each other. Communications system 262 may include machine-readable media such as any one of, some of, any combination of, or all of electrical cables, fiber optic cables, long term and/or short term storage (e.g., for sharing data) and/or means of sending signals through air (e.g., wireless communications), for example. Some examples of means of sending signals through air include systems for transmitting electromagnetic waves such as infrared and/or radio waves and/or systems for sending sound waves.

Input/output system 264 may include devices that have the dual function as input and output devices. For example, input/output system 264 may include one or more touch sensitive display screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 264 is optional, and may be used in addition to or in place of output system 252 and/or input device 254.

FIG. 3A shows one example of a passcode device 202. Passcode device 202 includes acquisition mechanism 302, cover 304, and interface 306. In other embodiments, passcode device 202 may not have all of the components listed above or may have other components instead of and/or in addition to those listed above.

Acquisition mechanism 302 may be a mechanism of acquiring fingerprints. Cover 304 may be a cover for covering acquisition mechanism 302, and for protecting acquisition mechanism 302 when acquisition mechanism 302 is not in use. Cover 304 may swing open, slide open, and/or snap off and on. Interface 306 is for connecting with an electronic device, such as a computer. Interface 306 may be a USB port, an RS 232 connection, a wireless connection using RFID, a serial port or any of a number of other types of connections.

Enrollment: Creating Asymmetric Keys & Registration Code

In the embodiments, described below, a user named Alice will be referred to as user A. In an embodiment, during enrollment, the user A presents or presses his or her body part(s) to scan in acceptable biometric prints. In an alternative embodiment as shown in FIGS. 3B and 3D, during enrollment, the user may enter a PIN. In another embodiment shown in FIGS. 3C and 5B, the user selects a number of favorite images so they may authenticate (identify) this user at a later time.

In an embodiment, during enrollment, in the secure area of the device, biometric print information obtained from the user is passed to a one-way hash function $\Phi$ or another one-way method of encoding that generates a registration code $R_A$. Then $R_A$ is securely given to the administrator. In an embodiment, during enrollment, a key pair (administrator key, user key) denoted as $(L_A, K_A)$ is generated for user A. In an embodiment, $L_A \ne K_A$ (i.e., the administrator key is not equal to the user key), which helps make the passcode system asymmetric. This means user A stores user key $K_A$ in its secure area of the device. In one embodiment, user key $K_A$ is stored on the memory of a smart card chip in passcode device. The administrator stores user A's public key $L_A$. In one embodiment, the user key $K_A$ is stored in the secure area of a chip inside a mobile phone in device 400, shown in FIG. 4.

In some embodiments, a second key pair denoted as $(L_{BA}, K_{BA})$ is created for the administrator corresponding to user A. In an embodiment, $L_{BA} \ne K_{BA}$ (i.e., the second administrator key is not equal to the second user key), which helps make the security system asymmetric. In an embodiment, the administrator stores key $K_{BA}$ in its database entry for user A; user A stores key $L_{BA}$ in a secure area of user A's passcode device 101. In an embodiment, this second key pair $(L_{BA}, K_{BA})$ may be used to encrypt administrator key $L_A$ as $\psi(L_A, L_{BA})$ and securely transmit $\psi(L_A, L_{BA})$ to administrator 102, shown in FIG. 1A. After the administrator receives $\psi(L_A, L_{BA})$, it may decrypt it by using key $K_{BA}$ and computing $\psi(\psi(L_A, L_{BA}), K_{BA})$ which equals $L_A$. This enables the asymmetric keys $L_A$ and $K_A$ to be created on passcode device 101 in a decentralized way and also transmit administrator key $L_A$ to administrator 102.

In an embodiment, the registration code $R_A$ and administrator key $L_A$ may be given to the administrator in the same physical place, such as at a bank, or the registration code $R_A$ and public key $L_A$ may be securely couriered or electronically transmitted to the administrator if enrollment is accomplished remotely. In some applications, the registration code and cryptography keys may be encrypted and distributed first using a Diffie-Hellman exchange.

Figure 7:
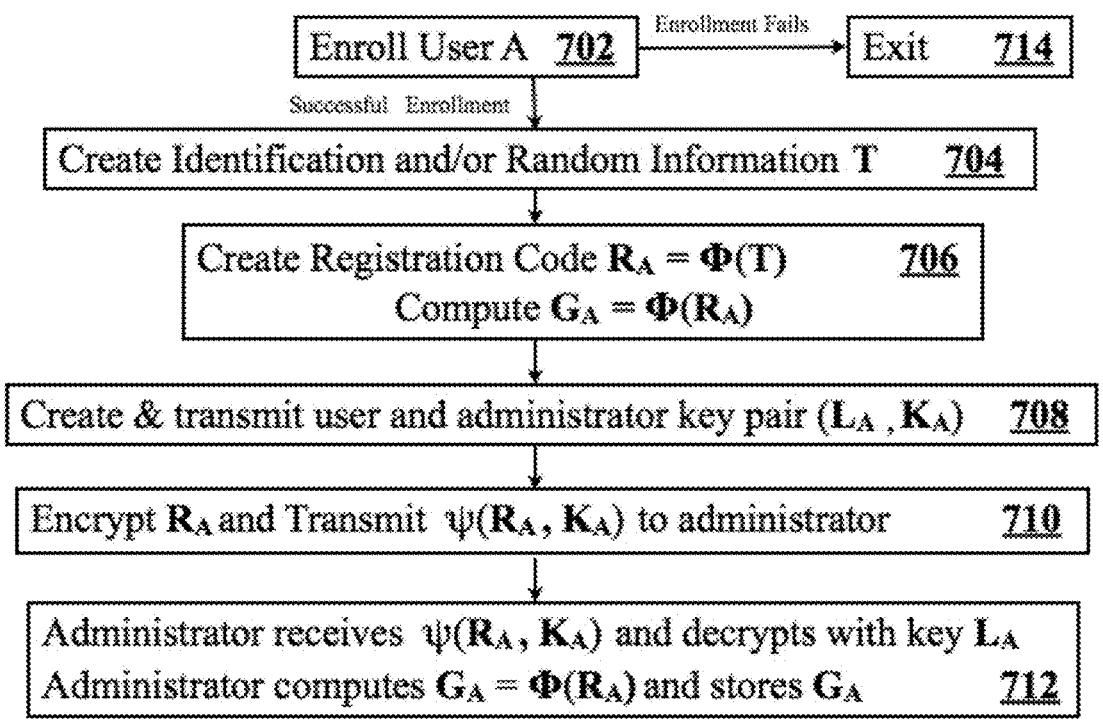
FIG. 7 shows a flowchart of an example of a method for enrolling a particular user to use a passcode device.

In an embodiment, during the enrollment of user A the following steps are executed. These steps are shown in the flowchart of FIG. 7.

Step 702.) The user presents user information in the form of biometrics, PIN or visual images. Check if this enrollment is successful. If successful, goto step 704. If enrollment of the user's identifying information fails, goto step 714.

Step 704.) Some of the biometric print information and/or random information from a physical device, denoted as T, is used to create a registration code $R_A$. A hash function $\Phi$ is applied to T, denoted as $\Phi(T)$, to create the registration code $R_A$. In other words, $R_A = \Phi(T)$. A hash function $\Phi$ is applied to $R_A$. The passcode generator $G_A$ is computed as $G_A = \Phi(R_A)$ and stored in secure memory of user A.

Step 706.) The asymmetric key pair $(L_A, K_A)$ is generated. $L_A$ is the administrator key stored by the backend server(s). $K_A$ is the user key stored on the user's device in a secure area.

Step 708.) In an embodiment, the registration code $R_A$ may be encrypted as $\psi(R_A, K_A)$ using asymmetric key cryptography and transmitted to the administrator via the Internet or wirelessly on a cellular network. In another embodiment, a Diffie-Hellman exchange may be used to securely establish a common registration code $R_A$ In an alternative embodiment, the display on the credit card or mobile phone may show the unencrypted registration code $R_A$ when the user is in the same physical location of the administrator. For example, the user could be present at the bank when enrolling and a bank employee could read $R_A$ from the display.

Step 710.) Using asymmetric key cryptography, the administrator decrypts $\psi(R_A, K_A)$ by using the other key $L_A$ to compute $\psi(\psi(R_A, K_A), L_A) = R_A$. In an alternative embodiment, the Diffie-Hellman exchange is used so that the administrator has $R_A$. When the administrator is in the same physical place as the user, the registration code $R_A$ may be securely displayed to the administrator in the same physical place or possibly decrypted by the administrator if received from a remote location.

Step 712.) The administrator uses the registration code $R_A$ it received and/or decrypted to compute the passcode generator $G_A$ as $G_A = \Phi(R_A)$ and stores $G_A$ for this particular user in a secure area. Completed.

Step 714.) If enrollment step 702 fails, then this procedure immediately exits with failure.

In some embodiments, one or more of the above steps may be combined or separated. In some embodiments, the following step may be added. The administrator may generate the key pair $(L_{BA}, K_{BA})$ and transmit public key $L_{BA}$ to user A where public key $L_{BA}$ is stored in secure area of user A's device. These additional asymmetric keys could also be used as backup or used to restore the security of the system if a compromise on the backend occurs at a later time.

In regard to steps 704 and 706, some of the random information from a physical device and/or biometric print information, denoted as U, is obtained during enrollment and is used to create a random seed $S_A$ that helps generate the public key and private key. In an embodiment, a one-way hash function $\Phi$ is applied to U, denoted as $\Phi(U)$, to create the random seed $S_A$. In other words, $S_A = \Phi(U)$. In an alternative embodiment, where the random information U may be generated by a quantum random system or other non-deterministic system, then the use of the one-way function may be omitted and the random seed $S_A$ is assigned the value of U (i.e., $S_A = U$).

In an embodiment, public key $L_A$ and private key $K_A$ are created on the device. In an alternative embodiment, public key $L_A$ and private key $K_A$ are created by the administrator and public key $K_A$ is transmitted to the device. In an embodiment, public key $L_A$ and private key $K_A$ are created on the device. In an embodiment, private key $K_{BA}$ and public key $L_{BA}$ are created in a smart card chip on the device (credit card). In another embodiment, private key $K_{BA}$ and public key $L_{BA}$ are created in a secure area of a chip on a mobile phone.

In an embodiment, a quantum random system creates quantum random information that is used to generate public key $L_A$ and private key $K_A$, where private key $K_A$ is stored on the device and public key $L_A$ is stored by the administrator. In an embodiment, a smart card chip receives random seed $S_A$ used to generate public key $L_A$ and private key $K_A$ from a quantum random system external to the smart card chip.

In an embodiment, a quantum random system is used to help create registration code $R_A$ that is sent to the device and sent to the administrator.

In an embodiment, a quantum random system creates quantum random information that is used to generate public key $L_{BA}$ and private key $K_{BA}$, where private key $L_{BA}$ is stored on the device and public key $K_{BA}$ is stored by the administrator. In an embodiment, public key $L_{BA}$ and private key $K_{BA}$ are generated by a smart card chip that receives random seed $S_{BA}$ from a quantum random system external to the smart card chip.

User a Generating a Passcode after Valid User Authentication

Figure 8:
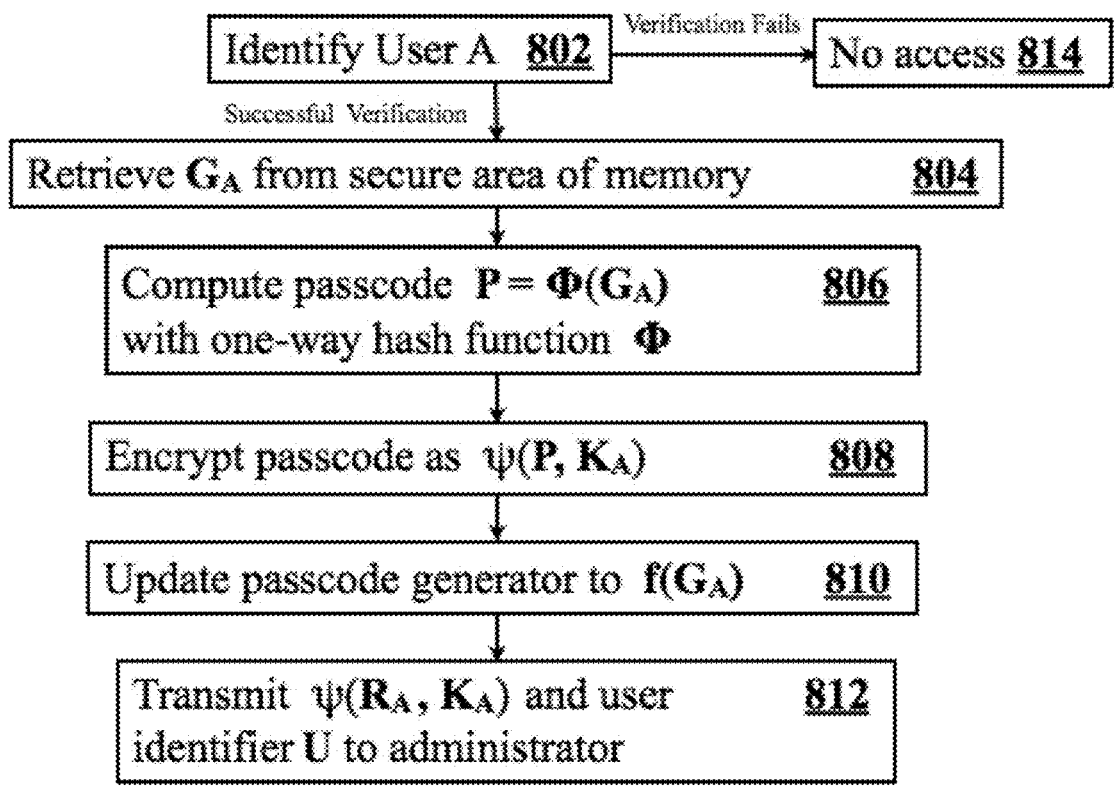
FIG. 8 shows a flowchart of an example of a method for identifying a particular user and generating a passcode with asymmetric secrets on the passcode device.
Figure 9:
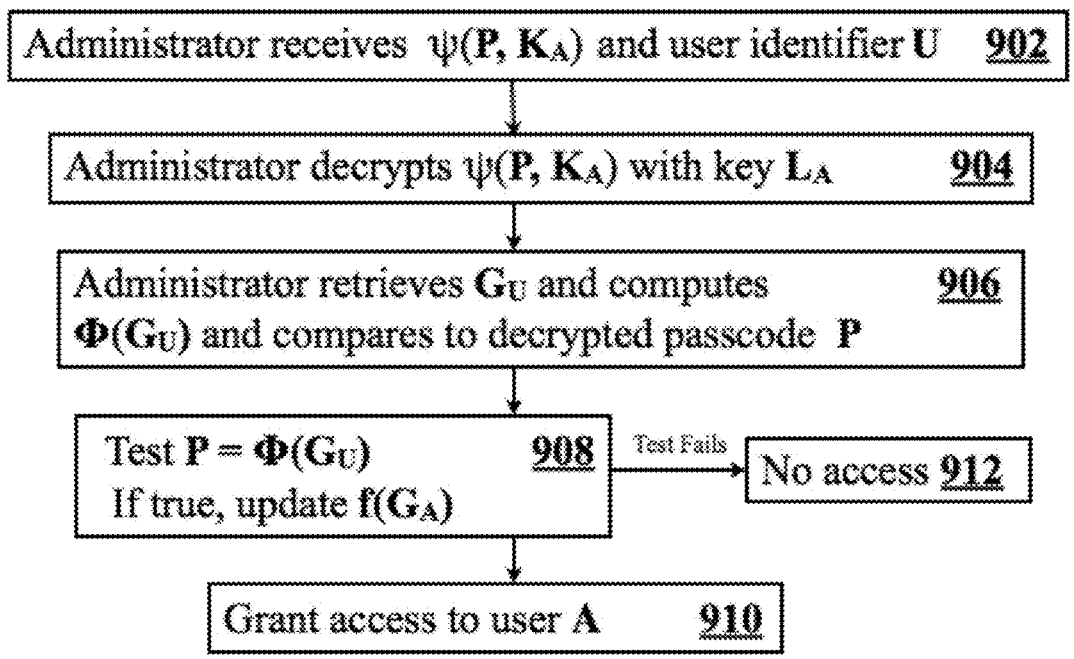
FIG. 9 shows a flowchart of an example of a method for the administrator to verify a passcode with asymmetric secrets sent from the passcode device.

The following steps are executed on the passcode device and shown in the flowchart of FIG. 8.

Step 802.) Identify user A, based on a valid authentication using biometrics, PIN or visual images. If the authentication is valid, goto step 804. If the authentication is invalid, goto step 814.

Step 804.) The passcode generator $G_A$ is retrieved from non-volatile memory in a secure area of the device.

Step 806.) A one-way hash function $\Phi$ is applied to $G_A$ or some part of $G_A$, denoted as $\Phi(G_A)$, to create the one-time passcode P. In other words, $P = \Phi(G_A)$.

Step 808.) Asymmetric key cryptography method $\psi$ encrypts passcode P with private key $K_A$ and creates an encrypted passcode. In other words, the encrypted passcode is $\psi(P, K_A)$.

Step 810.) The passcode generator G is changed to a new value. G is set equal to the new value f(G), where there are an infinite number of functions that f could be. The function f will be referred to as the perturbing function. One possible perturbing function f could add $\Phi(G)$ to G. Another possible perturbing function f could consider G as a number and add 1. Another possible perturbing function f could increase G by 2. Another possible perturbing function f could add 1 to G and permute the order of the symbols in G using some randomly chosen permutation. Even another possible perturbing function f could add 1 to G, and then permute the bits in G. G could be used as a seed for a deterministic random number generator, which is used by f to generate a new G.

Step 812.) The one-time passcode $\psi(P, K_A)$ is either transmitted to a display or submitted directly to the administrator. There are many different methods for transmitting the passcode to the administrator. In one method, the passcode can be displayed to the administrator, when the user is in the same physical location as the administrator. In a second method, the user passcode may be automatically transmitted over the mobile phone cellular network or TCP/IP. In a third method, the user may type the passcode into a web browser using the Internet. And in many other methods, the user may submit the passcode by some other electronic means such as a fax machine or typing into the keypad of an ATM machine.

Passcode Verification by the Administrator (Backend Servers)

The following steps are executed by the administrator. In an embodiment, the administrator verification is performed by one or more of computers 214, 216, 218, 220 as shown in FIG. 2A.

Step 902.) The administrator receives the encrypted passcode $\psi(P, K_A)$ and user identifier U from user A.

Step 904.) The administrator uses asymmetric key cryptography method $\psi$ to decrypt encrypted passcode $\psi(P, K_A)$ with administrator key $L_A$ and to reveal the decrypted passcode P. In other words, use cryptography method $\psi$ to compute $\psi(\psi(P, K_A), L_A)$ which equals passcode P.

Step 906.) The administrator uses identifier U as an index to retrieve passcode generator $G_U$. (The passcode generator for each user can be indexed by the user identifier in a database.) The administrator applies a hash function $\Phi$ to $G_U$, denoted as $\Phi(G_U)$, and compares it to the decrypted P.

Step 908.) If $\Phi(G_U)$ equals P, then goto step 910 (The passcode submitted by the field user is valid.) and the passcode generator is set equal to the new value of G', generated by applying the perturbing function to G, (G'=f(G)).

If $\Phi(G_U)$ is not equal to P, then goto step 912. The passcode is invalid.

Step 910.) The administrator grants access to user A.

Step 912.) No access is granted to user A.

This method of using asymmetric keys where the passcode device only has access to key $K_A$ and the administrator only has access to key $L_A$ makes the system more secure. If a hacker (adversary) or a government of hackers breaks into the administrator database and gain access to the administrator keys $L_A$ for each user A, then this information does not reveal to the adversary the value of any private key $K_A$, which only is stored on each passcode device (e.g., secure USB token or credit card with smartcard chip.) In order to generate the next correct, encrypted passcode, the hacker needs to know the value of $K_A$ for user A. The asymmetric keys help decentralize the security to the passcode devices.

Reducing User or Transmission Error

In some embodiments, the one-time passcode may be transmitted automatically (in some cases, wirelessly) to the backend server. In some cases, there may be transmission error, where one or more bits are not transmitted correctly. In some embodiments, to address this, the passcode device may use key $K_A$ to encrypt a number which indicates how many times that the perturbing function has been applied since the registration code was established at the time of enrollment. The backend server(s) then decrypt this number and this helps the backend determine the correct passcode generator $G_U$ to check against the passcode that was submitted from the user's device.

In some embodiments, the user may be reading the one-time passcode from the display and may incorrectly read it or write it down. Or the user may forget to record the one-time password, or type it into a keyboard incorrectly.

Reducing User Error: Lookahead Routine

As an alternative method of reducing user error, the user may scan their biometric again or select their images or enter their PIN again, and the passcode generator will generate a new passcode. When this happens, an optional feature enables the administrator to accept this new passcode even though the administrator is expecting to receive the previous passcode. Let m denote the maximum number of passcodes that an administrator will look ahead. In this alternative embodiment, the administrator (i.e., the backend server(s)) works around user error by executing the following steps. In an embodiment, the administrator verification is executed by computer(s) 214, 216, 218, 220 as shown in FIG. 2A.

Step I.) The administrator enters the encrypted passcode $\psi(P, K_A)$ received from the user.

Step II.) Use asymmetric key cryptography N to decrypt encrypted passcode $\psi(P, K_A)$ with public key $L_A$ and to create decrypted passcode P. In other words, use public key cryptography to compute $\psi(\psi(P, K_A), L_A)$ which equals passcode P.

Step III.) The administrator obtains a user identifier U associated with (e.g., extracts a user number U from) passcode P, and uses U to find the passcode generator G. (The passcode generator for each user can be indexed by the user number in a database.) The administrator applies a hash function $\Phi$ to $G_U$, denoted as $\Phi(G_U)$, and compares it to P.

Step IV.) If $\Phi(G_U)$ does not equal P, a temporary passcode generator $G_T$ is set equal to $f(G_U)$, where f is the perturbing function.

Initialize the counter k to zero. Then execute the following loop at most m times:

Step A.) The administrator compares $\Phi(G_T)$ to passcode P.

Step B.) If $\Phi(G_T)$ is not equal to P, set $G_T$ equal to $f(G_T)$. Increment k. If (k<m), go back to step A. If (k≥m), then send a message that the passcode P is not valid.

Step C.) Otherwise, $\Phi(G_T)$ equals P. For user U, set the new value of the passcode generator equal to $f(G_T)$. Send a message that the passcode P is valid.

Passcodes Dependent on the Time

In some embodiments, the one-time passcode can depend upon the time rather than being event based. For example, it could depend upon the time to the nearest 90 seconds. In this case, we denote the rounded time to the nearest 90 seconds as τ. If the current time when the passcode is received by the administrator is more than 90 seconds after the time when the passcode was created on the user's device, then this one-time passcode has expired. In this case, the passcode is invalid. Consequently, the administrator would deny access for this particular passcode submitted. In other embodiments, the rounded time τ can be computed upon the time to the nearest 60 seconds or two minutes or another interval of time that is used to compute the rounded time.

User Generating a Passcode Dependent on the Time

Figure 10:
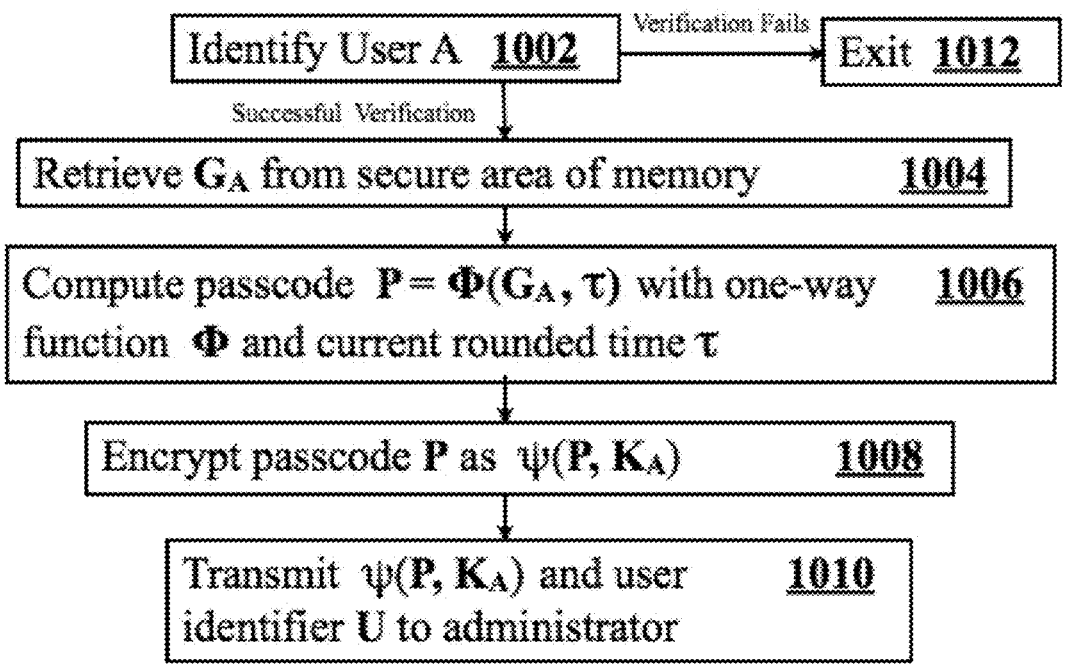
FIG. 10 shows a flowchart of an example of a method for identifying a particular user and generating a passcode with asymmetric secrets on the passcode device where the passcode is dependent on the current time.

For embodiments, dependent on time, after a valid authentication occurs, the following steps are executed by the passcode device and shown in the flowchart of FIG. 10.

Step 1002.) Identify user A, based on a valid authentication using biometrics, PIN or visual images. If the authentication is valid, goto step 1004. If the authentication is invalid, goto step 1012.

Step 1004.) The passcode generator $G_A$ is retrieved from non-volatile memory in a secure area of the device.

Step 1006.) A one-way hash function $\Phi$ is applied to $G_A$ or some part of $G_A$, and to rounded time σ denoted as $\Phi(G_A, \tau)$, to create the one-time passcode P. In other words, $P=\Phi(G_A,\tau)$.

Step 1008.) Use public key cryptography $\psi$ to encrypt passcode P with private key $K_A$ and create an encrypted passcode. In other words, encrypted passcode $\psi(P, K_A)$.

Step 1010.) Transmit encrypted passcode $\psi(P, K_A)$ to administrator. Completed.

Step 1012.) Verification of user A fails. Do not send a valid passcode or send an invalid passcode to administrator to deter an adversary trying to break the system.

In this and other embodiments, dependent on the time, the use of a perturbing function is omitted. In some embodiments, the $G_A$ may be updated by a perturbing function.

Time Dependent Passcode Verification by the Administrator

Figure 11:
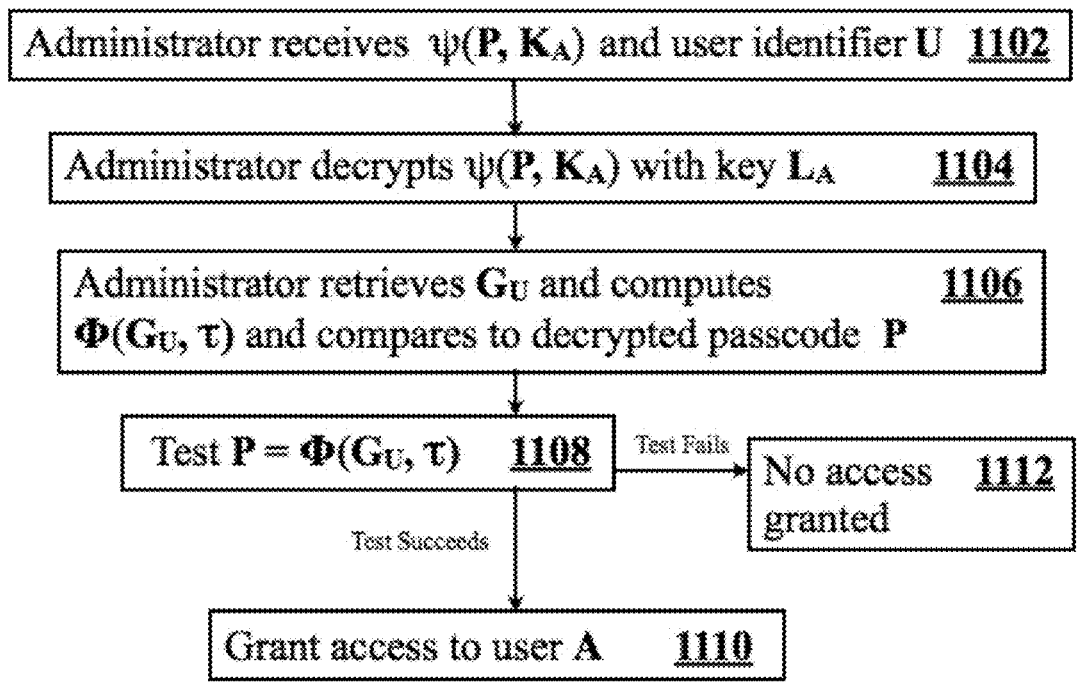
FIG. 11 shows a flowchart of an example of a method for the administrator to verify a passcode with asymmetric secrets sent from the passcode device where the passcode is dependent on the current time.

The following steps are executed by the administrator. In an embodiment, the administrator verification is performed by one or more of computers 214, 216, 218, 220 as shown in FIG. 2A. These steps are shown in the flowchart of FIG. 11.

Step 1102.) The administrator receives the encrypted passcode $\psi(P, K_A)$ and user identifier U from user A.

Step 1104.) The administrator uses public key cryptography $\psi$ to decrypt encrypted passcode $\psi(P, K_A)$ with administrator key $L_A$ and to reveal decrypted passcode P. In other words, use public key cryptography to compute $\psi(\psi(P, K_A), L_A)$ which equals passcode P.

Step 1106.) The administrator uses identifier U as an index to retrieve passcode generator $G_U$. (The passcode generator for each user can be indexed by the user identifier in a database.) The administrator applies a hash function $\Phi$ to $G_U$ and the rounded time τ—denoted as $\Phi(G_U, \tau)$—and compares $\Phi(G_U, \tau)$ to P.

Step 1108.) If $\Phi(G_U, \tau)$ equals P, then goto step 110. (The user passcode is valid.)

If $\Phi(G_U, \tau)$ does not equal P, then goto step 1112.

Step 1110.) User A is granted access by the administrator. Completed.

Step 1112.) No access is granted to user A by the administrator. Completed.

Each of the above embodiments may be used separately from one another in combination with any of the other embodiments. All of the above embodiments may be used together. For example, the different embodiments of passcode device 101 and administrators 102 may all be used in the same system 100. Similarly, the different aspects of each component may be used together or separately. For example, a passcode device 101 may include any one or any combination of no operating system, a secure area, embedded software, and/or being configured to function as a standalone device.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method comprising:
   enrolling, by a device, a user in a system based on at least user information, the device including a processor system having at least one processor and a memory system, the memory system having a nontransitory memory;
   storing the user information in the memory system of the device; and at a completion of the enrolling, generating asymmetric keys and a registration code based on quantum information from a semiconductor that detects the arrival of photons, the registration code being a sequence of symbols or bits;

wherein the asymmetric keys include a user key and an administrator key, which are different from one another, the user key being required to perform one or more operations on a physical token or in a secure area of the device, the administrator key being required to perform one or more operations on at least one backend server, the backend server including a second processor system having at least one processor and a second memory system;

wherein the administrator key is generated based on information provided by the user;

wherein it is mathematically intractable to guess the user key from the administrator key;

and wherein it is mathematically intractable to guess the administrator key from the user key.

2. The method of claim 1, further comprising: encrypting information based with the user key, such that the information is decryptable with the administrator key.

3. The method of claim 1, further comprising:
generating a passcode generator by applying a function to the registration code, the passcode generator being a string of characters or other form of a code;
generating a temporary passcode by applying a one-way function to the passcode generator; and
encrypting the temporary passcode with the user key to create an encrypted passcode.

4. The method of claim 1 wherein said semiconductor is a single photon avalanche diode.

5. The method of claim 3, wherein the temporary passcode is dependent on time, wherein the one way function has at least two inputs, one of the two inputs is for entering the passcode generator and the other of the two inputs is for the time, and the generating of the temporary passcode by applying the one-way function to the passcode generator, includes at least applying the one-way function to the passcode generator and to the time.

6. The method of claim 1, wherein the enrolling is performed on a mobile phone.

7. A method comprising:
generating, by the device, asymmetric keys based on collected user information, the asymmetric keys including a user key and an administrator key, which are different from one another, the device including a processor system having at least one processor and a memory system;
generating, via the device, a passcode that is valid temporarily and is based on information associated with a user;
encrypting the passcode with the user key, to form an encrypted passcode, the encrypted passcode requiring the administrator key to decrypt the passcode; and
sending, by the device to an administrator machine, the passcode to determine whether an attempted access is permitted;
wherein the user key is required to perform one or more operations on a physical token or in a secure area of the device, the administrator key is required to perform one or more operations on at least one backend server, the backend server including a second processor system having at least one processor and a second memory system;
the administrator machine being associated with the backend server;
wherein it is mathematically intractable to guess the user key from the administrator key;
and
wherein it is mathematically intractable to guess the administrator key from the user key.

8. The method of claim 7, wherein authenticating the user includes displaying visual images for the user to select; wherein at least one of said images is an animal, place, or an object.

9. The method of claim 7, wherein the generating of the passcode based on the user key includes generating the passcode from a passcode generator and the user key, the passcode generator being a string of characters or other form of a code.

10. The method of claim 7, wherein the generating of the passcode based on the user key includes generating the passcode from the passcode generator and a timestamp.

11. A method comprising:
generating, at a user machine, a code that is valid temporarily, the code being generated from a function that has time as an input to the function to which the function is applied to generate the code, the user machine including a processor system having at least one processor and a memory system;
encrypting, by the processor system of the user machine, the code with a user key, therein forming an encrypted code;
sending the encrypted code, from the user machine to an administrator machine;
receiving at the user machine from the administrator machine a determination of whether an attempted access of a secure entity is permitted, based on the encrypted code, which was encrypted with the user key;
wherein the user key and an administrator key form a pair of asymmetric keys, which are different from one another, the user key being required to perform one or more operations on a physical token or in a secure area of the user machine, the administrator key being required to perform one or more operations on at least one backend server, the backend server being associated with the administrator machine, the backend server including a second processor system having at least one processor and a second memory system;
wherein the administrator key is generated based on information provided by the user;
wherein it is mathematically intractable to guess the user key from the administrator key;
and
wherein it is mathematically intractable to guess the administrator key from the user key.

12. The method of claim 11, further comprising:
sending, to the administrator machine from the user machine, the administrator key;
the administrator key being unique to the user; and
the administrator key being required by the administrator machine for decrypting code, the encrypted code, which was encrypted with the user key.

13. The method of claim 11, wherein said code also depends upon information derived from a process implemented by physical device that contains a photon detector, where the process involves detecting the photons arriving at the photon detector.

14. The method of claim 11, further comprising:
enrolling the user in a security system that includes the machine;
creating, by the machine, the user key; and
wherein the user key is only created after a successful enrollment of the user.

15. The method of claim 11, further comprising:
storing the user key in a mobile phone.

16. The method of claim 11, further comprising:
storing the user key in a smart card chip.

17. The method of claim 11, wherein the code is only valid after an identification of a user based at least on the user's biometric prints.

18. A system comprising:
at least one nontransitory machine-readable medium storing instructions that cause one or more processors to perform a method including at least determining, by a machine, whether an encrypted submitted passcode is valid, where the encrypted submitted passcode was encrypted with a user key, by at least generating, by the machine, a generated passcode from a passcode generator and, the machine including at least a processor system having at least one processor and memory system;
decrypting the encrypted submitted passcode without access to the user key, therein producing the submitted passcode;
comparing, by the processor system, the submitted passcode to the generated passcode; and
if the submitted passcode matches the generated passcode, granting, by the machine, access to a secure entity;
wherein the user key and an administrator key form an asymmetric key pair, which are different from one another, the user key being required to perform one or more operations on a physical token or in a secure area of a user device, the administrator key being required to perform one or more operations on at least one backend server, the machine being associated with the backend server, the user device including a second processor system having at least one processor and a second memory system;
wherein the administrator key is generated based on information provided by the user;
wherein it is mathematically intractable to guess the user key from the administrator key;
and
wherein it is mathematically intractable to guess the administrator key from the user key.

19. The system of claim 18, further comprising: decrypting the encrypted submitted passcode with the administrator key; the administrator key being unique to the user.

20. The system of claim 18, wherein the method further includes encrypting the submitted passcode before the comparing by the processor system, the submitted passcode to the generated passcode.

21. The system of claim 20, wherein administrator key is used to decrypt the encrypted, submitted passcode.

22. The system of claim 18, wherein the method further including generating the submitted passcode after at least biometric print of a user is acquired.

23. The system of claim 18, wherein the method further including generating the submitted passcode on a chip inside a mobile phone.

24. A system comprising:
at least one nontransitory machine-readable medium storing instructions that cause one or more processors to perform a method including at least
receiving, by a machine, a submitted passcode, the machine including at least a processor system having at least one processor and a memory system, the submitted passcode being encrypted when submitted;
generating, by the machine, a generated passcode from a timestamp and generating by the machine an administrator key;
decrypting, by the machine, the submitted passcode with the administrator key to form a decrypted passcode;
after the decrypting, comparing, by the machine, the decrypted passcode to the generated passcode; and
if the decrypted passcode matches the generated passcode, then granting, by the machine, access to a secure entity;
wherein the administrator key and a user key form a pair of asymmetric keys, which are different from one another, the user key being required to perform one or more operations on a physical token or in a secure area of a user device, the administrator key being required to perform one or more operations on at least one backend server associated with the machine, the user device including a second processor system having at least one processor and a second memory system;
wherein the administrator key is generated based on information provided by the user;
wherein it is mathematically intractable to guess the user key from the administrator key;
and
wherein it is mathematically intractable to guess the administrator key from the user key.

25. The system of claim 24, wherein submitted passcode is encrypted with a user key.

26. A method comprising:
generating a registration code, at a user machine, based on a Diffie-Hellman exchange, the machine including a processor system having one or more processors and a memory system having a non-transient memory;
wherein the user machine and an administrator machine that grants access to a secure entity both derive the same passcode generator from the registration code; and
generating a pair of asymmetric keys;
wherein the asymmetric keys include a user key and an administrator key, which are different from one another, the user key being required to perform one or more operations on a physical token or in a secure area of the device, the administrator key being required to perform one or more operations on at least one backend server, the backend server being associated the administrator machine, the backend server including a second processor system having at least one processor and a second memory system;
wherein the administrator key is generated based on information provided by the user;
wherein it is mathematically intractable to guess the user key from the administrator key;
and
wherein it is mathematically intractable to guess the administrator key from the user key.

27. A method comprising:
acquiring identifying information or unpredictable information;
generating at least one registration code and at least one key by at least applying a first method to the identifying or unpredictable information or both, the at least one key being one key of a pair of asymmetric keys;
wherein the first method is of a type such that computing the identifying or unpredictable information from the registration code is computationally intractable;
submitting the registration code to a system that is distinct from where the acquiring occurred;
generating a passcode generator from the registration code, at a device where the acquiring occurred, by at least applying a second method to the registration code;
wherein the second method is of a type such that computing the registration code from the passcode generator is computationally intractable; and
storing the passcode generator and key at the device;

wherein the asymmetric keys include a user key and an administrator key, which are different from one another, the user key being required to perform one or more operations on a physical token or in a secure area of the device, the administrator key being required to perform one or more operations on at least one backend server, the backend server including a second processor system having at least one processor and a second memory system;

wherein the administrator key is generated based on information provided by the user;

wherein it is mathematically intractable to guess the user key from the administrator key; and wherein it is mathematically intractable to guess the administrator key from the user key.

28. A system comprising:
a nontransitory machine-readable medium storing thereon instructions for an Application Program Interface (API) having an argument for a passcode generator, an administrator key, and a user ID, the passcode generator being a string of characters;

wherein the passcode generator and administrator key are values generated from user information by applying a one-way function; and wherein the passcode generator and administrator key are values from which deriving the user information is expected to be intractable;

wherein the administrator key and a user key form a pair of asymmetric keys, which are different from one another, the user key being required to perform one or more operations on a physical token or in a secure area of the device, the administrator key being required to perform one or more operations on at least one backend server, the backend server including a second processor system having at least one processor and a second memory system;

wherein the administrator key is generated based on information provided by the user;

wherein it is mathematically intractable to guess the user key from the administrator key; and wherein it is mathematically intractable to guess the administrator key from the user key.

29. The system of claim 28, further comprising a database storing one or more passcode generators and administrator keys indexed according to user ID.

30. The system of claim 28, wherein the machine-readable medium stores thereon installation instructions, which cause one or more processors to perform a method including at least:
installing the instructions for the API on another system, and
receiving an input from which a decision is made as to whether:
to store the passcode generator and administrator key in a preexisting database, or
to set aside a storage space for the passcode generator and administrator key, wherein the storage space is unrelated to any preexisting database.

31. The system of claim 30, wherein the installation instructions cause the one or more processors to offer a choice, and the input is the reply to the offer.

32. The system of claim 28 wherein for each user ID a positive integer is also stored in the database that indicates how many times the said passcode generator has been updated by the administrator.

33. A system comprising:
a nontransitory machine-readable medium storing thereon machine instructions for generating, by a machine, an Application Program Interface (API) having an argument for an administrator key, time information, and a user ID, the machine including a processor system having one or more processors and a memory system, the administrator key being required for one or more operations on a backend server the backend server having a processor system having one more processors and a memory system, wherein the administrator key is a value generated from user information or random information or both, and wherein the administrator key is a value from which deriving the user information is expected to be intractable;

wherein the asymmetric keys include a user key and an administrator key, which are different from one another, the user key being required to perform one or more operations on a physical token or in a secure area of a user device;

wherein the administrator key is generated based on information provided by the user;

wherein it is mathematically intractable to guess the user key from the administrator key; and wherein it is mathematically intractable to guess the administrator key from the user key.

34. The method of claim 1, wherein the user information is at least a biometric print, a Personal Identification Number (PIN), or a sequence of images.

35. The method of claim 1, wherein the passcode device is a standalone device.

36. The method of claim 1, further comprising:
receiving, by the device from a sensor, at least one biometric print from the user before the enrolling, the sensor being on the device; and
wherein generating the asymmetric keys and the registration code includes generating the asymmetric keys and the registration code based on at least one biometric print.

37. The method of claim 3, wherein the temporary passcode is dependent on a rounded timestamp, the rounded timestamp being rounded to nearest 90 seconds.

38. The method of claim 7, wherein authenticating the user includes receiving the user's biometric print and matching the biometric print with a biometric template stored in the memory system of the device.

39. The method of claim 7, wherein the passcode is generated from a registration code, the registration code being a sequence of symbols or bits and generated from collected user information.

40. The method of claim 7, wherein the asymmetric keys are generated based on zener noise.

41. The method of claim 7, wherein the user key is stored on a physical token or in a secure area of the device; and wherein the administrator key is stored on the administrator machine.

42. The method of claim 11, wherein the code is only valid after an identification of a user based at least on the user's selection of visual images.

43. The method of claim 11, wherein the code is only valid after an identification of a user based at least on the user's entry of a PIN.

44. The system of claim 18, wherein the method further includes generating the submitted passcode after at least the user selects some visual images.

45. The system of claim 18, wherein the method further includes generating the submitted passcode after at least the user enters a PIN.

46. The system of claim 27, wherein the registration code is a sequence of symbols or bits.

47. The system of claim 27, wherein the passcode generator is a string of characters or other form of a code similar to the registration code.

48. The method of claim 1, further comprising generating the photon by a light emitting diode that is close enough to the semiconductor to ensure that at least one photon arrives at the semiconductor within a predetermined time period.

49. The method of claim 48, the light emitting diode and the semiconductor that detects the photons of the light emitting diode being associated with the same device.

50. A method comprising:
- receiving at a passcode device user identifying information, the passcode device having a processor system including one or more processor and a memory system;
- storing user identifying information in the memory system of the passcode device;
- generating, by the passcode device, a first code, the first code being generated based on the user identifying information;
- sending, by the passcode device, the first code to an administrator system that grants access to a secure entity;
- receiving, from the administrator system, a second code;
- generating, by the passcode device, a common registration code from the first code and the second code; and
- generating, by the passcode device, a passcode generator from the common registration code, the passcode generator being a string of characters or other form of a code;
- wherein the passcode device and the administrator system both derive the same passcode generator from the common registration code;
- generating asymmetric keys;
- wherein the asymmetric keys include a user key and an administrator key, which are different from one another, the user key being required to perform one or more operations on a physical token or in a secure area of the device, the administrator key being required to perform one or more operations on at least one backend server, the backend server including a second processor system having at least one processor and a second memory system;
- wherein the administrator key is generated based on information provided by the user;
- wherein it is mathematically intractable to guess the user key from the administrator key;

and
- wherein it is mathematically intractable to guess the administrator key from the user key.

51. The method of claim 50, wherein the first code and the second code are generated based on the quantum information from a photon detector.

52. The claim of method 51, wherein said photon detector is made from a semiconductor.

* * * * *